US007577262B2

(12) United States Patent
Kanamori et al.

(10) Patent No.: US 7,577,262 B2

(45) Date of Patent: Aug. 18, 2009

(54) MICROPHONE DEVICE AND AUDIO PLAYER

(75) Inventors: Takeo Kanamori, Hirakata (JP); Takashi Kawamura, Settsu (JP); Tomomi Matsuoka, Ibaraki (JP)

(73) Assignee: Panasonic Corporation, Osaka (JP)

( * ) Notice: Subject to any disclaimer, the term of this patent is extended or adjusted under 35 U.S.C. 154(b) by 1071 days.

(21) Appl. No.: 10/714,857

(22) Filed: Nov. 18, 2003

(65) Prior Publication Data

US 2004/0185804 A1 Sep. 23, 2004

(30) Foreign Application Priority Data

Nov. 18, 2002 (JP) ............................ 2002-333390

(51) Int. Cl.
*H04B 15/00* (2006.01)

(52) U.S. Cl. .................... 381/94.7; 381/92; 381/71.11; 381/94.3

(58) Field of Classification Search ................ 381/94.7, 381/92, 71.11, 26, 94.3, 111, 122; 348/231.4; 704/226

See application file for complete search history.

(56) References Cited

U.S. PATENT DOCUMENTS

| | | | | |
|---|---|---|---|---|
| 5,548,335 | A * | 8/1996 | Mitsuhashi et al. | 348/373 |
| 6,285,768 | B1 * | 9/2001 | Ikeda | 381/71.11 |
| 6,339,758 | B1 | 1/2002 | Kanazawa et al. | |
| 6,404,886 | B1 * | 6/2002 | Yoshida et al. | 379/406.01 |
| 6,639,986 | B2 * | 10/2003 | Kanamori et al. | 381/71.1 |
| 6,917,688 | B2 * | 7/2005 | Yu et al. | 381/94.7 |
| 7,020,291 | B2 * | 3/2006 | Buck et al. | 381/92 |
| 7,110,554 | B2 * | 9/2006 | Brennan et al. | 381/94.7 |
| 7,181,026 | B2 * | 2/2007 | Zhang et al. | 381/92 |

FOREIGN PATENT DOCUMENTS

| | | |
|---|---|---|
| JP | 09-005154 | 1/1997 |
| JP | 10-207490 | 8/1998 |
| JP | 2000-47699 | 2/2000 |
| JP | 3084883 | 7/2000 |

OTHER PUBLICATIONS

Bernard Widrow et al., "Adaptive Signal Processing", Prentice Hall, pp. 412-425.

Yoshio Nakadai et al., Speech Recognition in Car Environments Using Spectral Subtraction with Two Microphones Technical Report of IEICE, pp. 41-48.

"Adaptive Signal Processing", Bernard Widrow et al., Prentice Hall, pp. 412-425, Mar. 15, 1985.

"Speech Recognition in Car Environments Using Spectral Subtraction with Two Microphones", Yoshio Nakadai et al., Technical Report of IEICE, pp. 41-48, Dec. 1989.

* cited by examiner

*Primary Examiner*—Vivian Chin
*Assistant Examiner*—Jason R Kurr
(74) *Attorney, Agent, or Firm*—Wenderoth, Lind & Ponack, L.L.P.

(57) ABSTRACT

A signal generating section generates a main signal and a noise reference signal. A determining section determines whether a level ratio is larger than a predetermined value. An adaptive filter section generates a signal indicative of a signal component of a target sound included in the noise reference signal generated by the signal generating section, and learns a filter coefficient only when the determining section determines that the level ratio is larger than the predetermined value. A subtracting section subtracts the signal generated by the adaptive filter section from the noise reference signal. A noise suppressing section suppresses a signal component of noise included in the main signal by using the main signal and the noise reference signal after subtraction by the subtracting section.

24 Claims, 23 Drawing Sheets

MICROPHONE DEVICE AND AUDIO PLAYER

BACKGROUND OF THE INVENTION

1. Field of the Invention

The present invention relates to microphone devices and audio players and, more specifically, to a microphone device and an audio player which detects a desired sound coming from a specific direction with noise being suppressed.

2. Description of the Background Art

The configurations of conventional microphone devices are described with reference to FIGS. 24 through 26.

FIG. 24 is an illustration showing the configuration of a conventional microphone device of Example 1. In FIG. 24, the conventional microphone device includes a first microphone unit 1010, a second microphone unit 1020, a signal adding section 1030, a first signal subtracting section 1031, a signal amplifying section 1050, an adaptive filter section 1060, and a second signal subtracting section 1062. Each of the microphone units 1010 and 1020 is placed so as to be oriented to the front (left in FIG. 24). The signal adding section 1030 adds a signal output from the first microphone unit 1010 and a signal output from the second microphone unit 1020. The first signal subtracting section 1031 subtracts the signal output from the second microphone unit 1020 from the signal output from the first microphone unit 1010. The signal amplifying section 1050 multiplies a signal output from the signal adding section 1030 by ½. The adaptive filter section 1060 is supplied with a signal output from the first signal subtracting section 1031, and outputs a signal obtained through filtering performed by an adaptive filter included therein. The second signal subtracting section 1062 subtracts a signal output from the adaptive filter section 1060 from a signal output from the signal amplifying section 1050. An output from the second signal subtracting section 1062 is an output from the microphone device. The adaptive filter section 1060 learns a filter coefficient from the signal output from the second signal subtracting section 1062 and the signal output from the first signal subtracting section 1031.

The operation of the conventional microphone device of Example 1 is described below. In order to detect a sound coming from the front, the microphone units 1010 and 1020 each output approximately the same signal. In order to detect a sound coming from other directions, the microphone units 1010 and 1020 output signals that are different in phase. The output signals from the microphone units 1010 and 1020 are then added together by the signal adding section 1030. The resultant signal obtained through addition is then normalized in level by the signal amplifying section 1050. That is, the amplitude of the signal is amplified by ½. With this, a main signal having components of the sound coming from the front can be obtained. Also, with the output from the first signal subtracting section 1031, it is possible to achieve a directivity characteristic such that the main axis of directivity is oriented to a direction of 90 degrees with respect to the front and the front direction is a direction of a minimum sensitivity in the directivity (that is, the sensitivity of directivity is minimum in the front direction). That is, the signal output from the first signal subtracting section 1031 serves as a noise reference signal which does not include the components of the sound coming from the front. The adaptive filter section 1060 uses the main signal output from the signal amplifying section 1050 and the noise reference signal output from the first signal subtracting section 1031 to achieve adaptive directivity. That is, the direction of a minimum sensitivity in the directivity is uniquely determined to be oriented to a noise sound coming from a direction other than the front direction.

FIG. 25 is an illustration showing the configuration of a conventional microphone device of Example 2. In FIG. 25, the conventional microphone device includes a first microphone unit 1010, a second microphone unit 1020, a first adaptive filter section 1040, a first signal delaying section 1041, a first signal subtracting section 1042, a second adaptive filter section 1060, a second signal delaying section 1061, and a second signal subtracting section 1062.

The first adaptive filter section 1040 is supplied with an output signal from the second microphone unit 1020 and then outputs the filtering results obtained by an adaptive filter included therein. The first signal delaying section 1041 delays a signal output from the first microphone unit 1010. The first signal subtracting section 1042 subtracts a signal output from the first adaptive filter section 1040 from a signal output from the first signal delaying section 1041. The first adaptive filter section 1040 learns a filter coefficient from a signal output from the first signal subtracting section 1042 and a signal output from the second microphone unit 1020. The second signal delaying section 1061 delays the signal output from the first signal delaying section 1041. The second adaptive filter section 1060 is supplied with a signal output from the first signal subtracting section 1042, and then outputs the filtering results obtained by an adaptive filter included therein. The second signal subtracting section 1062 subtracts a signal output from the second adaptive filter section 1060 from a signal output from the second signal delaying section 1061. The subtraction result is an output from the microphone device. The second adaptive filter section 1060 learns a filter coefficient from a signal output from the second signal subtracting section 1062 and a signal output from the first signal subtracting section 1042.

The operation of the conventional microphone device of Example 2 is described below. The first adaptive filter section 1040, the first signal delaying section 1041, and the first signal subtracting section 1042 performs a canceling operation on sound waves coming to the microphone units 1010 and 1020. That is, the signal output from the first signal subtracting section 1042 serves as a noise signal for the second adaptive filter section 1060. That is, the signal output from the first signal subtracting section 1042 is a signal serving a purpose similar to that of the signal output from the first subtracting section 1031 in FIG. 24. However, the conventional microphone device of Example 2 is different from that of Example 1 in the following point. That is, the directivity is fixed in Example 1, whilst the directivity can be changed by using the adaptive filters in Example 2.

FIG. 26 is an illustration showing the configuration of a conventional microphone device of Example 3. The conventional microphone device illustrated in FIG. 26 includes a first unidirectional microphone unit 1011, a second unidirectional microphone unit 1012, a first FFT section 1070, a second FFT section 1080, a two-input-type spectrum subtraction section 1090, and a voice recognition section 2000.

In FIG. 26, the first unidirectional microphone unit 1011 is placed so that the main axis of its directivity is oriented to the front. The second unidirectional microphone unit 1012 is placed so that the main axis of its directivity is oriented to the back. The first FFT section 1070 is supplied with a signal output from the first unidirectional microphone unit 1011 to find a frequency spectrum. The second FFT section 1080 is supplied with a signal output from the second unidirectional microphone unit 1012 to find a frequency spectrum. The two-input-type spectrum subtraction section 1090 is supplied with signals output from both of the FFT sections 1070 and 1080 to subtract, in a power spectrum region, the signal spectrum derived by the second FFT section 1080 from the signal spectrum derived by the first FFT section 1070, thereby outputting a spectrum of a target signal. The voice recognition section 2000 is supplied with the spectrum of the target signal output from the two-input-type spectrum subtraction section 1090 for voice recognition.

The operation of the conventional microphone device of Example 3 is described below. In Example 3, the first unidirectional microphone unit 1011 has a directivity characteristic of collecting a desired sound (target sound) from the front. The second unidirectional microphone unit 1012 has a directivity characteristic of mainly collecting noise. Therefore, a main signal m1 is obtained from the first unidirectional microphone unit 1011, while a noise reference signal m2 is obtained from the second unidirectional microphone unit 1012. Then, a spectrum of the main signal m1 is found by the first FFT section 1070, while a spectrum of the noise reference signal m2 is found by the second FFT section 1080. The power spectrum of the noise reference signal is subtracted from the power spectrum of the main signal by the two-input-type spectrum subtraction section 1090. With this, the power spectrum of the signal components are estimated. Note that, in a one-input-type spectrum subtraction scheme, a noise spectrum is estimated, assuming that noise is stationary during a time section in which the target sound has not yet arrive. Therefore, in the one-input-type spectrum subtraction scheme, only suppression of stationary noise is possible. On the other hand, according to the configuration of the microphone device of Example 3 adopting a two-input-type spectrum subtraction scheme, the spectrum of the noise reference signal can always be obtained by the second unidirectional microphone unit 1012. Therefore, suppression of non-stationary noise is possible. As such, according to the microphone device of Example 3, the ratio of voice recognition at the voice recognition section 2000 at a later stage can be improved by suppressing stationary noise and non-stationary noise. Note that, although the device illustrated in FIG. 26 is dedicated for voice recognition, the device can be used as a microphone device by performing IFFT at the last stage to convert the spectrum to a time signal and then to a waveform signal with frame overlap.

In the microphone device of Example 1, a large noise suppressing effect can be achieved under an environment where noise is coming from a certain direction. However, the microphone device of Example 1 does not handle noise coming from a plurality of directions. Therefore, under the actual noisy environment where noise sources simultaneously exist in various directions, the microphone device of Example 1 can merely achieve a noise suppressing effect equivalent to that obtained by conventional unidirectional microphone devices.

In the microphone device of Example 2, the noise reference signal is obtained by using the first adaptive filter. Here, in order to stably operate the first adaptive filter under the actual environment, it is required to cause the first adaptive filter to learn a filter coefficient only when the voice from the talker is sufficiently larger than the surrounding noise. Therefore, the microphone device of Example 2 cannot achieve a noise suppression effect until filter convergence has been completed. Moreover, under the noisy environment, filter convergence is difficult. Further, as with Example 1, the microphone device of Example 2 cannot handle a plurality of noise sources. Still further, since the microphone device of Example 2 was devised with the aim of suppressing wind noise, which has no correlation between unit signals, the direction of the target sound cannot be restricted. In other words, the largest one of the sounds that has arrived at the microphone device is regarded as the target sound. Therefore, it is impossible to performing a process of collecting sounds with a sound in a specific direction being enhanced.

In the microphone device of Example 3, the main signal and the noise reference signal are converted into spectrums. Then, noise is suppressed based on the power spectrums by using a spectrum subtraction scheme. With this, even if noise sources exist in a plurality of directions, their noise can be simultaneously suppressed. In the microphone device of Example 3, however, inclusion of even a slightest amount of components of the target sound in the noise reference sound will significantly deteriorate the sound quality of the processed sound or, at worse, may cancel the target sound itself. Moreover, in the actual sound field, a reflected wave may be diffracted to enter the microphone device even if the direction of a minimum sensitivity in the directivity of the unidirectional microphone unit are oriented to the direction of the target sound. Further, in normal microphone units, the amount of attenuation in the direction of a minimum sensitivity in the directivity is not infinite but on the order of 10 to 15 db. Therefore, the direct wave of the target sound may not be completely eliminated and may be included in the noise reference signal. Still further, in the spectrum subtraction scheme, a process delay will occur due to a frame processing. Therefore, the microphone device using the spectrum subtraction scheme is not suitable for simultaneous calls or loudspeakers.

Moreover, the above conventional microphone devices focus on suppressing additive noise, which is different from the target sound. The above conventional microphone devices cannot suppress multiplicative noise, which arrives after being reflected on a surface of reflection, such as a wall, a desk, or a floor. Therefore, the frequency characteristic of the target sound may be distorted due to, for example, the influence of reflection in a sound field where the microphone device is actually used. For this reason, particularly for the purpose of voice recognition, a mismatch in recognition may occur, leading to erroneous recognition.

SUMMARY OF THE INVENTION

Therefore, an object of the present invention is to provide a microphone device capable of stably operating even under noise from a plurality of noise sources in the actual use environment and also achieving a high S/N ratio.

Another object of the present invention is to provide a microphone device which suppresses multiplicative noise caused by, for example, a reflective wave of a target sound or other factors and additive noise caused by accumulation of noise.

Still another of the present invention is to generate a main signal and noise reference signal used in a noise suppressing process with a simple scheme.

In order to attain the objects mentioned above, the present invention adopts the following structures. That is, a first aspect of the present invention is directed to a microphone device which detects a target sound coming from a direction of the target sound. The microphone device includes a signal generating section, a determining section, an adaptive filter section, a subtracting section, and a noise suppressing section. The signal generating section generates a main signal indicative of a result obtained through detection with a sensitivity in the direction of the target sound and a noise reference signal indicative of a result obtained through detection with a sensitivity higher in another direction than in the direction of the target sound. The determining section determines whether a level ratio indicative of a ratio of a level of the main signal to the noise reference signal generated by the signal generating section is larger than a predetermined value. The adaptive filter section generates a signal indicative of a signal component of the target sound included in the noise reference signal generated by the signal generating section by performing, by an adaptive filter included in the adaptive filter section, a filtering process on the main signal generated by the signal generating section, and learns a filter coefficient only when the determining section determines that the level ratio is larger than the predetermined value. The subtracting section subtracts the signal generated by the adaptive filter section from the noise reference signal generated by the signal generating section. The noise suppressing section suppresses a signal component of noise included in the main signal by using the main signal and the noise reference signal after subtraction by the subtracting section.

Note that "a main signal indicative of a result obtained through detection with a sensitivity in the direction of the target sound" means that the main signal can be not only a signal output from a microphone unit, but also a signal obtained by performing a predetermined process on a signal by the microphone unit. That is, the main signal can be not only a signal output from a microphone unit whose main axis of directivity is oriented to the direction of the target sound, but also a signal obtained by performing a predetermined process on a signal output from any microphone unit (that is, a non-directional microphone unit or a directional microphone unit whose main axis of directivity is oriented to a predetermined direction). Similarly, "a noise reference signal indicative of a result obtained through detection with a sensitivity higher in another direction than in the direction of the target sound" means that the noise reference signal can be not only a signal output from a microphone unit, but also a signal obtained by performing a predetermined process on a signal output from any microphone unit.

A second aspect of the present invention is directed to a microphone device which detects a target sound coming from a direction of the target sound. The microphone device includes a signal generating section, a determining section, an adaptive filter section, a subtracting section, a reflection information calculating section, and a reflection correcting section. The signal generating section generates a main signal indicative of a result obtained through detection with sensitivity in the direction of the target sound and a noise reference signal indicative of a result obtained through detection with a sensitivity higher in another direction than in the direction of the target sound. The determining section determines whether a level ratio indicative of a ratio of a level of the main signal to the noise reference signal generated by the signal generating section is larger than a predetermined value. The adaptive filter section generates a signal indicative of a signal component of the target sound included in the noise reference signal generated by the signal generating section by performing, by an adaptive filter included therein, a filtering process on the main signal generated by the signal generating section, and learns a filter coefficient only when the determining section determines that the level ratio is larger than the predetermined value. The subtracting section subtracts the signal generated by the adaptive filter section from the noise reference signal generated by the signal generating section. The reflection information calculating section calculates information about a difference in arrival time between a direct wave of the target sound and a reflected wave of the target sound. The reflection correcting section corrects, based on the information calculated by the reflection information calculating section, distortion in a frequency characteristic of the main signal caused by the reflected wave.

In a third aspect, the signal generating section includes a first microphone unit and a second microphone unit. The first microphone unit is placed so that a main axis of directivity is oriented to the direction of the target sound. The second microphone unit is placed so that a minimum sensitivity axis of directivity is oriented to the direction of the target sound (a direction of a minimum sensitivity in the directivity).

Also, in a fourth aspect, the microphone device further includes a signal delaying section. The signal delaying section is provided between an output end of the noise reference signal in the signal generating section and the subtracting section, and delays the noise reference signal so as to satisfy conditions of convergence of the adaptive filter of the adaptive filter section.

Furthermore, in a fifth aspect, the predetermined value is changeable.

Still further, in a sixth aspect, the signal generating section includes a first microphone unit, a second microphone unit, a delaying section, an amplifying section, a first subtracting section, and a second subtracting section. The second microphone unit has a characteristic identical to a characteristic of the first microphone unit. The delaying section outputs a signal output from the first microphone unit as being delayed by a predetermined delay amount. The amplifying section amplifies the signal output from the delay section. The first subtracting section subtracts the signal amplified by the amplifying section from a signal output from the second microphone unit to generate the main signal. The second subtracting section subtracts the signal output from the delaying section from the signal output from the second microphone unit to generate the noise reference signal. The predetermined delay amount is set so that the noise reference signal includes components of a sound coming from a direction other than the direction of the target sound more than components of the target sound. The amplification factor in the amplifying section is set so as to cause a difference in a sensitivity to the target sound between the main signal and the noise reference signal.

Still further, in a seventh aspect, the microphone device further includes a setting section for changing the predetermined delay amount used in the delay section.

Still further, in an eighth aspect, the signal generating section includes a first microphone unit, a second microphone unit, and a combining section. The second microphone unit has a characteristic identical to a characteristic of the first microphone unit. The combining section generates, based on signals output from the first and second microphone unit, the main signal with sensitivity in the direction of the target sound, and generating a noise signal with minimum sensitivity in the direction of the target sound.

Still further, in a ninth aspect, the signal generating section includes a first microphone unit, a second microphone unit, a signal adding section, and a signal subtracting section. The second microphone unit is placed so that a main axis of directivity is oriented to a direction which is different from a main axis of directivity of the first microphone unit. The signal adding section adds a first signal output from the first microphone unit and a second signal output from the second microphone unit to generate the main signal. The signal subtracting section subtracts a third signal, which is either one of the first signal and the second signal, from a fourth signal, which is either one of the first signal and the second signal but other than the third signal, to generate the noise reference signal.

Still further, in a tenth aspect, the signal generating section includes a first microphone unit, a second microphone unit, a stereo signal generating section, an inverse combining section, and a combining section. The second microphone unit has a characteristic identical to a characteristic of the first microphone unit. The stereo signal generating section generates, based on the first and second microphone units, a stereo signal formed by a right channel signal and a left channel signal. The inverse combining section generates, based on the stereo signal, signals output from the first and second microphone units. The combining section generates the main signal and the noise reference signal based on the signals generated by the inverse combining section.

Still further, in an eleventh aspect, the signal generating section includes a first microphone unit, a second microphone unit, a stereo signal generating section, a signal adding section, and a signal subtracting section. The second microphone unit has a characteristic identical to a characteristic of the first microphone unit. The stereo signal generating section generates, based on the first and second microphone units, a stereo signal formed by a right channel signal and a left channel signal. The signal adding section adds he right channel signal and the left channel signal to generate the main signal. The signal subtracting section subtracts a first signal, which is either one of the right channel signal and the left channel signal, from a second signal, which is either one of the right channel signal and the left channel signal but other than the first signal, to generate the noise reference signal.

Still further, in a twelfth aspect, the microphone device further includes a reflection information calculating section and a reflection correcting section. The reflection information calculating section calculates, based on the filter coefficient of the adaptive filter section, information about a difference in arrival time between a direct wave of the target sound and a reflected wave of the target sound. The reflection correcting section corrects, based on the information calculated by the reflection information calculating section, distortion in a frequency characteristic of the main signal caused by the reflected wave. Furthermore, the noise suppressing section suppresses the signal component of the noise included in the main signal by using the main signal corrected by the reflection correcting section and the noise reference signal after subtraction by the subtracting section.

Still further, in a thirteenth aspect, the noise suppressing section includes and a time-variant coefficient filter section and a noise suppression filter coefficient calculating section. The time-variant coefficient filter section causes the main signal to be subjected to a filtering process at a noise suppression filter included in the time-variant coefficient filter section. The noise suppression filter coefficient calculating section calculates, based on the main signal and the noise reference signal after subtraction by the subtracting section, a filter coefficient of the noise suppression filter for suppressing the signal component of the noise included in the main signal. Here, the filtering process reflects the filter coefficient calculated by the noise suppression filter coefficient calculating section.

Still further, in a fourteenth aspect, the noise suppression filter coefficient calculating section includes a first frequency analyzing section, a second frequency analyzing section, a power spectrum ratio calculating section, a multiplying section, and a coefficient calculating section. The first frequency analyzing section calculates a power spectrum of the main signal. The second frequency analyzing section calculates a power spectrum of the noise reference signal after subtraction by the subtracting section. The power spectrum ratio calculating section calculates a time average of a power spectrum ratio between the power spectrum calculated by the first frequency analyzing section and the power spectrum calculated by the second frequency analyzing section only when the determining section determines that the level ratio is smaller than the predetermined value. The multiplying section multiplies the time average of the power spectrum ratio calculated by the power spectrum ratio calculating section by the power spectrum calculated by the second frequency analyzing section. The coefficient calculating section calculates the filter coefficient of the noise suppression filter based on the power spectrum calculated by the first frequency analyzing section and the multiplication result of the multiplying section.

Still further, a fifteenth aspect of the present invention is directed to a microphone device which detects a target sound coming from a direction of the target sound. The microphone device includes a first microphone unit, a second microphone unit, a signal adding section, a signal subtracting section, and a noise suppressing section. The second microphone unit is placed so that a main axis of directivity is oriented to a direction which is different from a main axis of directivity of the first microphone unit. The signal adding section adds a first signal output from the first microphone unit and a second signal output from the second microphone unit to generate a main signal. The signal subtracting section subtracts a third signal, which is either one of the first signal and the second signal, from a fourth signal, which is either one of the first signal and the second signal but other than the third signal to generate a noise reference signal. The noise suppressing section suppresses a signal component of noise included in the main signal by using the main signal and the noise reference signal.

Still further, a sixteenth aspect of the present invention is directed to a microphone device which detects a target sound coming from a direction of the target sound. The microphone device includes a first microphone unit, a second microphone unit, a stereo signal generating section, an inverse combining section, a combining section, and a noise suppressing section. The second microphone unit has a characteristic identical to a characteristic of the first microphone unit. The stereo signal generating section generates, based on the first and second microphone units, a stereo signal formed by a right channel signal and a left channel signal. The inverse combining section generates, based on the stereo signal, signals to be output from the first and second microphone units. The combining section generates, based on the signals generated by the inverse combining section, a main signal indicative of a result obtained through detection with a sensitivity in the direction of the target sound and a noise reference signal indicative of a result obtained through detection with a sensitivity higher in another direction than in the direction of the target sound. The noise suppressing section suppresses a signal component of noise included in the main signal by using the main signal and the noise reference signal.

Still further, a seventeenth aspect of the present invention is directed to a microphone device which detects a target sound coming from a direction of the target sound. The microphone device includes a first microphone unit, a second microphone unit, a stereo signal generating section, a signal adding section, a signal subtracting section, and a noise suppressing section. The second microphone unit has a characteristic identical to a characteristic of the first microphone unit. The stereo signal generating section generates, based on the first and second microphone units, a stereo signal formed by a right channel signal and a left channel signal. The signal adding section adds the right channel signal and the left channel signal of the stereo signal to generate a main signal. The signal subtracting section subtracts a first signal, which is either one of the right channel signal and the left channel signal, from a second signal, which is either one of the right channel signal and the left channel signal but other than the first signal, to generate a noise reference signal. The noise suppressing section suppresses a signal component of noise included in the main signal by using the main signal and the noise reference signal.

Still further, an eighteenth aspect of the present invention is directed to an audio player. The audio player includes an audio recording section, a signal generating section, a determining section, an adaptive filter section, a subtracting section, a noise suppressing section, and a reproducing section. The audio recording section records audio signals of channels of at least two types. The signal generating section generates, based on the audio signals recorded on the audio recording section, a main signal indicative of a result obtained through detection with a sensitivity in the direction of the target sound and a noise reference signal indicative of a result obtained through detection with a sensitivity higher in another direction than in the direction of the target sound. The determining section determines whether a level ratio indicative of a ratio of a level of the main signal to the noise reference signal generated by the signal generating section is larger than a predetermined value. The adaptive filter section generates a signal indicative of a signal component of the target sound included in the noise reference signal generated by the signal generating section by performing, by an adaptive filter included in the adaptive filter section, a filtering process on the main signal generated by the signal generating section, and learns a filter coefficient only when the determining section determines that the level ratio is larger than the predetermined value. The subtracting section subtracts the signal generated by the adaptive filter section from the noise reference signal generated by the signal generating section. The noise suppressing section suppresses a signal component of noise included in the main signal by using the main signal and the noise reference signal after subtraction by the subtracting section. The reproducing section reproduces the main signal with the signal component of the noise being suppressed by the noise suppressing section.

Still further, in a nineteenth aspect, the audio player further includes: a video recording section for recording a video signal related to the audio signals recorded on the audio recording section; a video reproducing section for reproducing the video signal recorded on the video recording section; and a direction accepting section for accepting from a user an input of a direction in which a sound is to be enhanced. Here, the signal generating section generates the main signal and the noise reference signal by taking the direction accepted by the direction accepting section as the direction of the target sound.

According to the first aspect, the signal component of the target sound included in the noise reference signal is suppressed. Then, based on the main signal and the noise reference signal, a process of suppressing noise is performed. Therefore, a process of suppressing noise can be performed by using an ideal noise reference signal, thereby achieving a high S/N ratio. Furthermore, according to the first aspect, sounds other than the target sound can be suppressed as noise. Therefore, not only noise in a particular one direction but also noise in all directions can be suppressed.

Also, according to the second aspect, the influence of the reflected wave on the main signal can be corrected. Therefore, it is possible to achieve a microphone device having a stable sensitive-to-frequency characteristic irrespectively of the sound field surrounding the microphone device. Furthermore, the sound quality is not changed by the reflecting object. Therefore, particularly for the purpose of voice recognition, a significant improvement in the recognition ratio can be expected.

Furthermore, according to the third aspect, the main signal and the noise reference signal can be easily generated. Also, the two microphone units can be placed closely to each other so as to make contact with each other, thereby achieving reduction is size of the microphone device.

Still further, according to the fifth aspect, it is possible to control the range of angles formed on both sides of the front direction for sound collection of the microphone device. This makes it possible to set a range of sound collection angles depending on purposes and change the range of sound collection angles as a zoom microphone can do.

Still further, according to the sixth aspect, a directivity pattern in which the sensitivity characteristics for the main signal and those for the noise reference signal are approximately identical to each other in a direction other than the target sound direction. Therefore, matching in the noise suppressing process performed at the later stage can be improved, thereby improving the sound quality after process.

Still further, according to the seventh aspect, with the delay time being changed, the direction of collecting sounds can be controlled.

Still further, according to the ninth aspect, the main signal and the noise reference signal can be obtained by using a signal output from, for example, a one-point stereo microphone.

Still further, according to the tenth and eleventh aspects, the main signal and the noise reference signal can be obtained by using a stereo signal.

Still further, according to the twelfth aspect, both of additive noise and the reflected wave, which is multiplicative noise, can be simultaneously suppressed. Therefore, it is possible to achieve an always flat, high-S/N-ratio microphone frequency characteristic without suffering from the influence of the sound field.

Still further, according to the fifteenth, sixteenth, and seventeenth aspects, the main signal and the noise reference signal, which are used in a process of suppressing noise, can be generated with a simple scheme.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
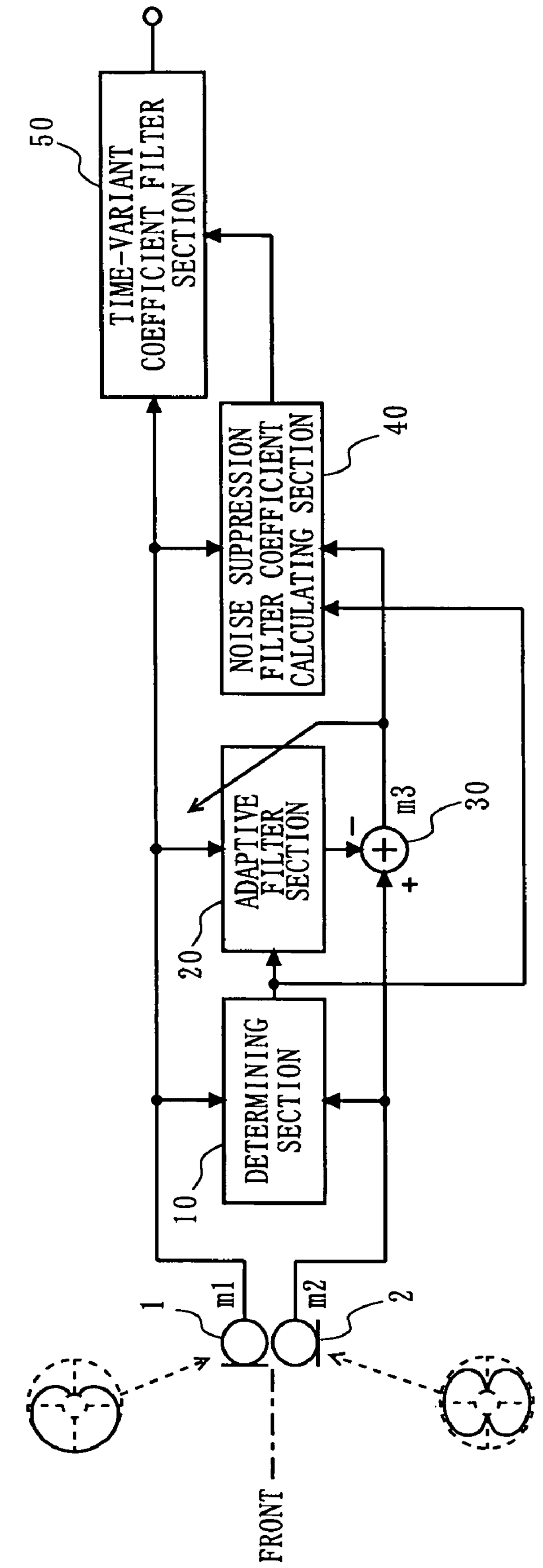
FIG. 1 is a block diagram illustrating the configuration of a microphone device according to Embodiment 1.

A microphone device according to Embodiment 1 of the present invention is described below with reference to FIGS. 1 through 7. FIG. 1 is a block diagram illustrating the configuration of the microphone device according to Embodiment 1. In FIG. 1, the microphone device includes a first microphone unit 1, a second microphone unit 2, a determining section 10, an adaptive filter section 20, a signal subtracting section 30, a noise suppression filter coefficient calculating section 40, and a time-variant coefficient filter 50.

In FIG. 1, the first microphone unit 1 is a unidirectional microphone unit, whose main axis of directivity is oriented to the front. The second microphone unit 2 is a bidirectional microphone unit, whose main axis of directivity is oriented so as to form a right angle with respect to the front direction. Note that the microphone device detects a sound coming from a desired direction. Hereinafter, a sound to be detected is referred to as a target sound, and the desired direction is referred to as a direction of the target sound or a target sound direction. In Embodiment 1, the front direction is the direction of the target sound.

The determining section 10 is supplied with a signal m1 output from the first microphone unit 1 and a signal m2 output from the second microphone unit 2 and, based on a level ratio between these signals, determines whether a desired sound (target sound) has arrived. The adaptive filter section 20 performs a filtering process on the signal m1 with a filter coefficient for output. The signal subtracting section 30 subtracts a signal output from the adaptive filter section 20 from the signal m2.

The noise suppression filter coefficient calculating section 40 is supplied with the signal m1 as a main signal and a signal m3 output from the first signal subtracting section 30 as a noise reference signal. With the use of the main signal and the noise reference signal, the noise suppression filter coefficient calculating section 40 calculates a filter coefficient representing a filter characteristic for noise suppression. The calculated filter coefficient is fed to the time-variant coefficient filter section 50. The time-variant coefficient filter section 50 is supplied with the signal m1, and then performs a filtering process on the received signal m1 in accordance with the filter coefficient calculated by the noise suppression filter coefficient calculating section 40 for output.

The operation of the above-structured microphone device is described below. In the following description, it is assumed that the target sound comes from the front unless otherwise mentioned.

In FIG. 1, the first microphone unit 1 is placed in the vicinity of the second microphone unit 2. With the first and second microphone units 1 and 2 being placed closely to each other, the second microphone unit 2 can collect sounds (that is, noise) other than the target sound at a position approximately the same as the position of the first microphone unit 1. The microphone device according to Embodiment 1 suppresses noise that has entered the first microphone unit 1 by the time-variant coefficient filter section 50, thereby achieving sound collection at a high S/N ratio. At this time, the signal m2 is used as the noise reference signal. Therefore, ideally, each of the microphone units 1 and 2 collects sounds in a sound field of the same place. That is, ideally, the microphone units 1 and 2 are placed so as to make contact with each other on condition that they do not affect determination of their directivity with each other. That is why, in Embodiment 1, the microphone units 1 and 2 are placed so as to contact closely to each other.

Also, in Embodiment 1, at the later stages in the microphone device (the noise suppression filter coefficient calculating section 40 and the time-variant coefficient filter section 50), a noise suppressing scheme using a time-variant coefficient filter is employed. If the target sound enters the second microphone unit 2, detrimental effects, such as distortion or reduction in level, will occur in the processed sound. Therefore, suppression of the inclusion of the target sound in the noise reference signal is a key to using of the above scheme. In Embodiment 1, for the purpose of minimizing the inclusion of the target sound in the noise reference signal, the microphone device is structured so that a direction of a minimum sensitivity in the directivity of the second microphone unit 2 is oriented to the front. The reason why a bidirectional microphone unit is used as the second microphone unit 2 is that the bidirectional microphone unit has a feature that manufacturing variations in characteristics, such as the orientation of the direction of a minimum sensitivity in the directivity and the amount of sensitivity attenuation, are less than those of a unidirectional unit or other microphone units.

With the second microphone unit 2 being structured as described above, the inclusion of the target sound in the noise reference signal can be suppressed, but cannot be completely eliminated. In the actual use environment, a reflected wave of the target sound caused by sound influences of a reflective object, such as a box to which the microphone unit is mounted or a substance that surrounds the microphone device, may be detected by the second microphone unit 2. In addition to the influence by the reflected wave of the target sound, even if the direction of a minimum sensitivity in the directivity of the second microphone unit 2 is oriented to the front, a direct wave of the target sound can be still detected slightly (the target sound that has not been completely suppressed remains). For this reason, the signal m2 inevitably includes a component of the target sound. To get around this problem, in Embodiment 1, the determining section 10, the adaptive filter section 20, and the first signal subtracting section 30 form a canceller. With this canceller, the component of the target sound included in the noise reference signal is suppressed. This makes it possible to obtain an ideal noise reference signal with the target sound being suppressed.

Also, in FIG. 1, the signal output from the first microphone unit 1 has a high possibility that it includes more components of the target sound than those of noise. The microphone device according to Embodiment 1 adapts the signal m1 to a signal having the target sound components included in the signal m2 so as to equalize these signals. That is, the main signal is equalized to the signal having the target sound components included in the noise reference signal. With this, the canceller can be accurately operated.

Furthermore, in Embodiment 1, an adaptive filter included in the adaptive filter section 20 of the above canceller performs a learning operation only when the target sound is sufficiently large. Specifically, whether the target sound is larger than noise or not is detected by the determining section 10. When the detection result of the determining section 10 indicates that the target sound is larger than noise, the adaptive filter section 20 performs a learning operation at its adaptive filter. With this, the filter coefficient of the adaptive filter section 20 can converge to a stable value. Note that the determining section 10 is required to detect both direction and level of sound. The structure of the determining section 10 is described in detail below (refer to FIG. 2).

Figure 2:
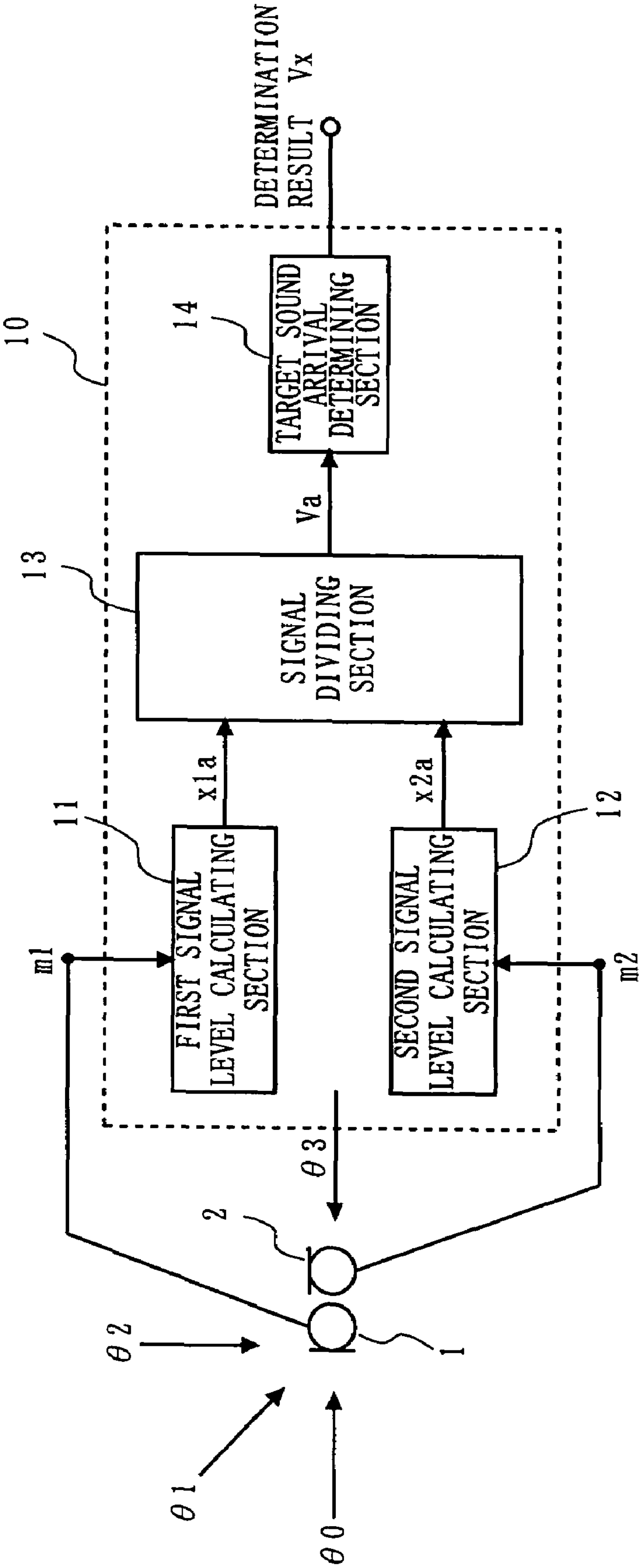
FIG. 2 is an illustration showing the configuration of a determining section illustrated in FIG. 1.

Next, the detained structure and operation of each component of the microphone device are described below. FIG. 2 is an illustration showing the structure of the determining section illustrated in FIG. 1. In FIG. 2, the determining section 10 includes a first signal level calculating section 11, a second signal level calculating section 12, a signal dividing section 13, and a target sound arrival determining section 14.

In FIG. 2, the first signal level calculating section 11 is supplied with the signal m1 to calculate a short-time average of the signal level of the signal m1, and then outputs a first signal level x1*a*. The second signal level calculating section 12 is supplied with the signal m2 to calculate a short-time average of the signal level of the signal m2, and then outputs a second signal level x2*a*. The signal dividing section 13 finds a signal ratio (level ratio) between the first signal level x1*a* and the second signal level x2*a*. Specifically, the signal dividing section 13 outputs a signal ratio Va by solving Va=x1*a*/x2*a*. Based on the output from the signal dividing section 13, the target sound arrival determining section 14 determines whether the target sound is sufficiently large, that is, whether the target sound is larger than noise. Specifically, the target sound arrival determining section 14 compares the signal ratio Va with a predetermined threshold value th1, and then outputs a determination result Vx indicating whether the signal ratio Va is larger than the predetermined threshold value th1. More specifically, the determination result Vx can take either one of binary values, that is, a value (which is assumed herein as "1") indicating that the signal ratio Va is larger than the predetermined threshold value th1 or a value (which is assumed herein as "0") indicating that the signal ratio Va is equal or smaller than the predetermined threshold value th1).

In FIG. 2, consider a case where a sound coming from a direction of θ0 (front direction) is dominant, meaning that the sound coming from the direction of θ0 is significantly larger than sounds coming from other directions, and these other sounds are too small to be negligible. In this case, the direction of θ0, which coincides with the front direction, is a direction of a maximum sensitivity for the first microphone unit 1, and also is a direction of a minimum sensitivity for the second microphone unit 2. Therefore, the value of the first signal level x1*a* is relatively large compared with that in a case which will be described below, while the value of the second signal level x2*a* is relatively small compared with that in the case which will be described below. Therefore, in this case, the signal ratio Va (=x1*a*/x2*a*) is relatively large compared with that in the case which will be described below.

Next, consider a case where a sound coming from a direction of θ1 is dominant. Here, the first microphone unit 1 has unidirectional directivity whose main axis is oriented to the direction of θ0. The second microphone unit 2, on the other hand, has bidirectional directivity whose main axis is oriented to a direction of θ2. Therefore, in the case where the sound coming from the direction of θ1 is dominant, the value of the first signal level x1*a* is decreased and the value of the second signal level x2*a* is increased compared with the case where the sound coming from the direction of θ0 is dominant. Consequently, the signal ratio Va is decreased compared with the case where the sound coming from the direction of θ0 is dominant. Furthermore, when the dominant sound direction is changed from the direction of θ0 to the direction of θ2, the value of the first signal level x1*a* is further decreased, while the value of the second signal level x2*a* is further increased. As a result, the signal ratio Va is decreased compared with the case where the sound coming from the direction of θ0 is dominant.

Next, consider a case where a sound coming from a direction of θ3 is dominant. Here, the direction of θ3 is a direction of a minimum sensitivity in the directivity of both of the microphone units 1 and 2. In this case, the first signal level x1*a* and the second signal level x2*a* are both decreased and, consequently, the signal ratio Va does not have a large value.

Figure 3:
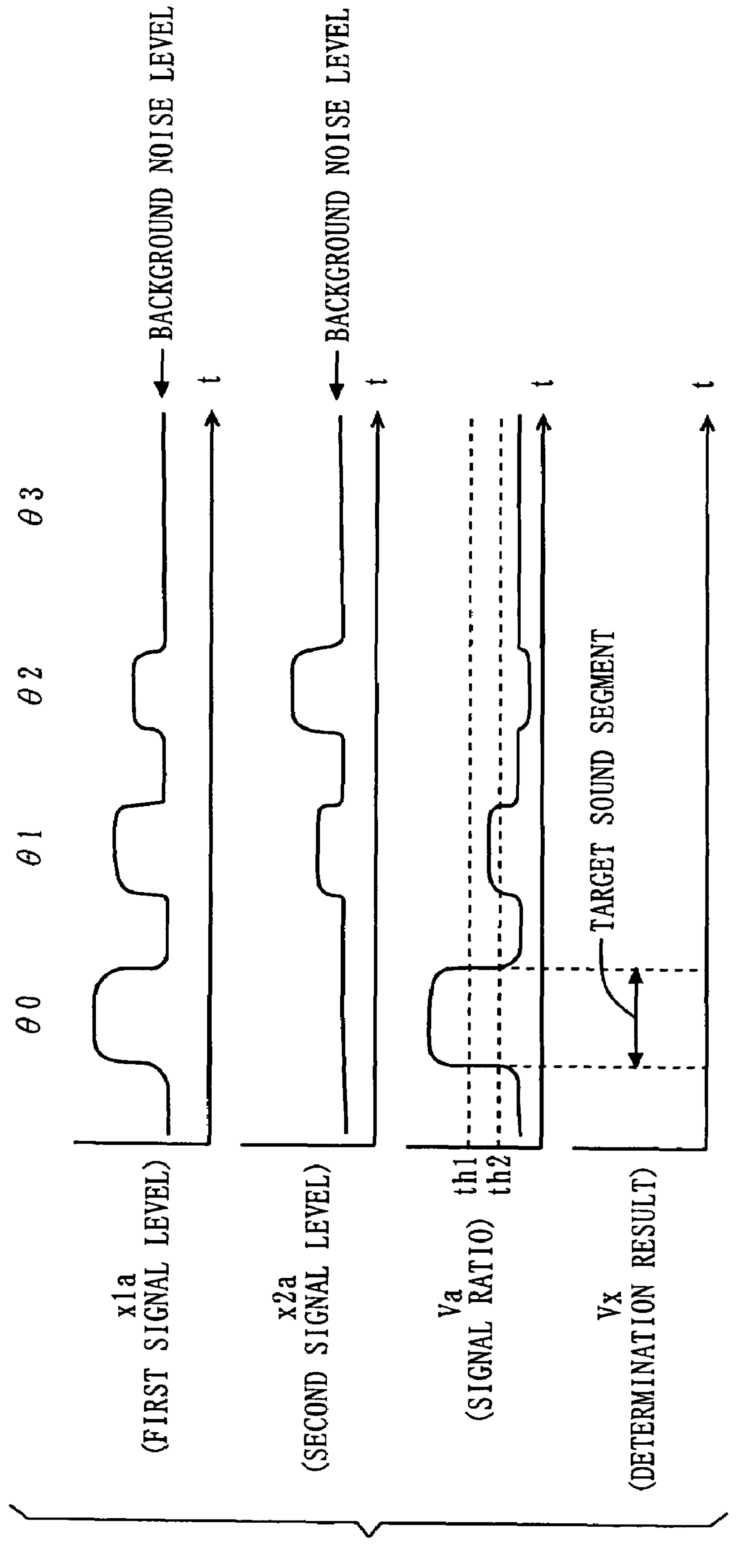
FIG. 3 is an illustration showing an exemplary state of sound detection in a case where a dominant sound direction is any one of directions of θ1 through θ3.

FIG. 3 is an illustration showing an exemplary state of sound detection in a case where the dominant sound direction is any one of the directions of θ1 through θ3. In FIG. 3, signal waveforms of signals at the first signal level x1*a*, the second signal level x2*a*, and the signal ratio Va are illustrated. Here, by setting the threshold value th1 to a level illustrated in FIG. 3, it is possible to detect, as the determination result Vx, that the sound in the direction of θ0 is dominant. That is, when the threshold value Vx is set to the level illustrated in FIG. 3, the value of the determination result Vx indicates "1" only when the sound in the direction of θ0 is dominant. In Embodiment 1, the sound in the front direction (the direction of θ0) is taken as the target sound. Therefore, based on the value of the determination result Vx, it is possible to detect the target sound is dominant. When not only the sound in the direction of θ0 but also the sound in the direction of θ1 are taken as the target sound, a threshold value th2 illustrated in FIG. 3 is used. With the threshold value th2, the determination result Vx indicates "1" not only when the sound in the direction of θ0 is dominant but also when the sound in the direction of θ1 is dominant.

Next, the operation performed by the adaptive filter section 20 and the signal subtracting section 30 for suppressing the target sound included in the noise reference signal (the signal m2) is described below. In the adaptive filter section 20, the adaptive filter equalizes the signal m1 to the signal representing the components of the target signal included in the signal m2. That is, from the signal m1, the adaptive filter section 20 generates a signal representing the components of the target signal included in the signal m2. An example of a scheme that can be employed by the adaptive filter is the Least-Mean-Square (LMS) algorithm (learning identification scheme). The signal subtracting section 30 subtracts the signal generated by the adaptive filter section 20 from the signal m2, thereby producing the signal m3. Consequently, the signal m3 is a noise reference signal with the target sound components being suppressed.

Here, based on the determination result Vx obtained by the determining section 10, the adaptive filter section 20 determines whether to learn a filter coefficient. Specifically, when it is determined by the determining section 10 that the target sound is dominant, that is, when the determination result Vx indicates "1", the adaptive filter section 20 performs a filter coefficient learning process. On the other hand, when it is determined by the determining section 10 that the target sound is not dominant, that is, when the determination result Vx indicates "0", the adaptive filter section 20 does not perform a filter coefficient learning process.

First, consider a case where the target sound is dominant. In this case, the adaptive filter section 20 performs a filter coefficient learning process. In this case, since noise is negligible, the second microphone unit 2 can be regarded as not detecting noise, and but detecting only the components of the target sound (that is, the components of reflected waves of the target sound and the remaining direct wave of the target sound that has not been completely suppressed). That is, the signal m2 can be regarded as not including the noise components and only including the target sound components. In this case, the adaptive filter section 20 outputs the signal m2 as the resultant signal obtained by performing a filtering process on the signal m1. That is, a filter coefficient learning process is performed so that the signal m3 is 0. As a result of this learning process, the adaptive filter section 20 can obtain the filter coefficient with high accuracy for generating, based on the first signal m1, a signal representing the target sound components included in the signal m2.

Next, consider a case where the target sound is not dominant. In this case, the signal m2 includes the target sound components as well as noise components that are too large to be negligible. Therefore, in this case, even if performing a filter coefficient learning process so that the signal m3 is 0, the adaptive filter section 20 cannot obtain an appropriate filter coefficient. That is, it is impossible to obtain a filter coefficient for generating, based on the signal m1, the target sound components included in the signal m2. Furthermore, in this case, a learning process might cause dispersion of the filter coefficient. For the above reasons, the adaptive filter section 20 should not perform a filter coefficient learning process in this case. Thus, the adaptive filter section 20 does not perform such a process when the target sound is not dominant.

As described above, with the use of the determination result of the determining section 10, a filter coefficient learning process is performed only when the magnitude of the target sound is large compared with the surrounding noise. With this, the adaptive filter section 20 can converge the filter coefficient to a stable value.

As such, the microphone device according to Embodiment 1 separates, to a certain extent, the target sound and the noise as pretreatment by using the directivity characteristic of each of the microphone units 1 and 2. Then, the above-described canceller is used to suppress the target sound components that are included in the sound reference signal and cannot be completely suppressed with the structure using the microphone units 1 and 2. With this, the microphone device according to Embodiment 1 can obtain an ideal noise reference signal.

If the noise reference signal is sought to be obtained only with the canceller without performing such pretreatment by using the directivity characteristic of the microphone units, one drawback is that the accuracy of learning control is deteriorated, because the target sound is difficult to detect under a noisy environment. Another drawback is that enhancement of the target sound is not performed by using the directivity of the microphone units, thereby decreasing the correlation of the learning signal (target sound) and making it difficult to converge the filter coefficient.

Described below is the operation of the noise suppression filter coefficient calculating section 40 and the time-variant coefficient filter section 50 for suppressing noise components included in the main signal (the signal m1). Note that, noise suppression effects achieved by the noise suppression filter coefficient calculating section 40 and the time-variant coefficient filter section 50 can be achieved through a two-input-type spectrum subtraction scheme. However, the spectrum subtraction scheme requires a frame process for eventually converting the spectrum to a waveform signal, thereby causing a process delay. To reduce a signal delay in the frame process, there are some measures, such as shortening the frame length or increasing frame overlaps. However, these measures are not practical because shortening the frame length decreases frequency resolution, and increasing frame overlaps increases the amount of process. To get around such problems, in Embodiment 1, a scheme using a time-variant coefficient filter is adopted, in which a process delay little occurs.

Figure 4:
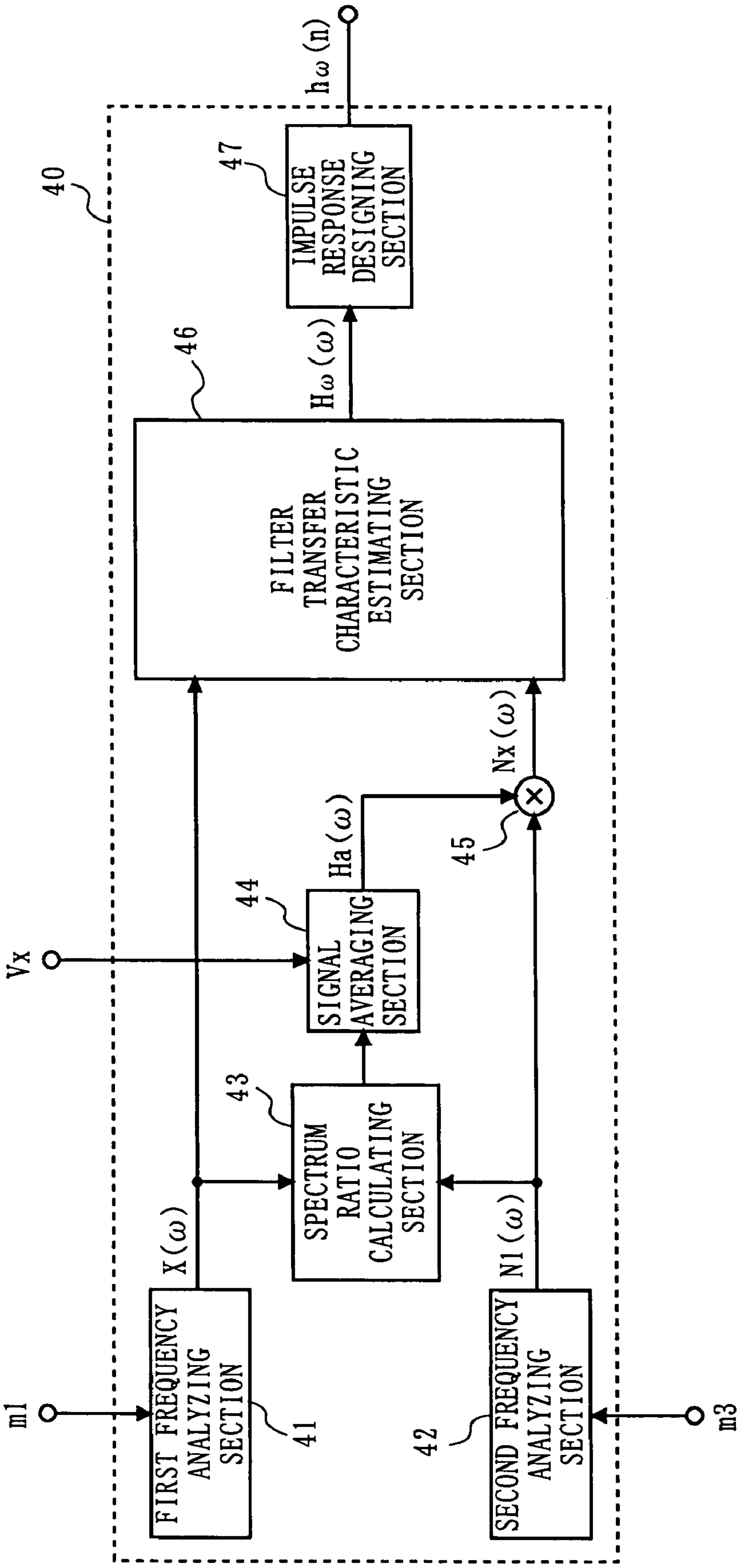
FIG. 4 is an illustration showing an exemplary structure of a noise suppression filter coefficient calculating section 40.

FIG. 4 is an illustration showing an exemplary structure of the noise suppression filter coefficient calculating section 40. In FIG. 4, the noise suppression filter coefficient calculating section 40 includes a first frequency analyzing section 41, a second frequency analyzing section 42, a spectrum ratio calculating section 43, a signal averaging section 44, a signal multiplying section 45, a filter transfer characteristic estimating section 46, and an impulse response designing section 47.

In FIG. 4, the first frequency analyzing section 41 calculates a power spectrum X(ω) of the signal m1, which is the main signal. The second frequency analyzing section 42 calculates a power spectrum N1(ω) of the signal m3, which is the noise reference signal. Here, the frequency analyzing sections 41 and 42 can be achieved by using a known scheme capable of deriving the power of the frequency component, such as FFT, a filter bank, wavelet transformation, or DCT.

The spectrum ratio calculating section 43 is supplied with the power spectrum X(ω) calculated by the first frequency analyzing section 41 and the power spectrum N1(ω) calculated by the second frequency analyzing section 42 to derive a spectrum ratio H(ω)=X(ω)/N1(ω). The signal averaging section 44 is supplied with the spectrum ratio H(ω) derived by the spectrum ratio calculating section 43 and the determination result Vx of the determining section 10. Then, a time average Ha(ω) for each frequency component is calculated when the surrounding noise is dominant compared with the target sound (that is, when the value of the determination result Vx indicates "0"). The signal multiplying section 45 multiplies the power spectrum N1(ω) calculated by the second frequency analyzing section 42 by the time average Ha(ω) calculated by the signal averaging section 44 for each frequency component. Then, the signal multiplying section 45 outputs the multiplication result as Nx(ω). Note that, due to directivity patterns being different from each other and the characteristics of the microphone units, the shape and level of the spectrum of the noise component included in the spectrum X(ω) of the main signal are not necessarily identical to those of the spectrum N1(ω) of the noise reference signal. The spectrum ratio calculating section 43, the signal averaging section 44, and the signal multiplying section 45 described above collectively form a structure so as to coincide the spectrum of the noise components included in the spectrum X(ω) of the main signal and the spectrum N1(ω) of the noise reference signal with each other. Therefore, the spectrum Nx(ω) obtained as the multiplication result of the signal multiplying section 45 represents the noise components included in the spectrum X(ω) of the main signal. Therefore, this spectrum Nx(ω) is hereinafter referred to as an estimated noise spectrum Nx(ω).

The filter transfer characteristic estimating section 46 is supplied with the power spectrum X(ω) calculated by the first frequency analyzing section 41 and the estimated noise spectrum Nx(ω) calculated by the signal multiplying section 45 to calculate a transfer characteristic Hw (ω) of a noise suppression filter. This transfer characteristic Hw(ω) can be calculated based on, for example, the Wiener filter method, by solving, for example, $Hw(\omega)=(X(\omega)-Nx(\omega))/X(\omega)$.

The impulse response designing section 47 takes the transfer characteristic Hw(ω) calculated by the filter transfer characteristic estimating section 46 as a target characteristic, and outputs a filter coefficient hw(n) so that the transfer characteristic asymptotically approaches the target characteristic for each sampling.

Figure 5:
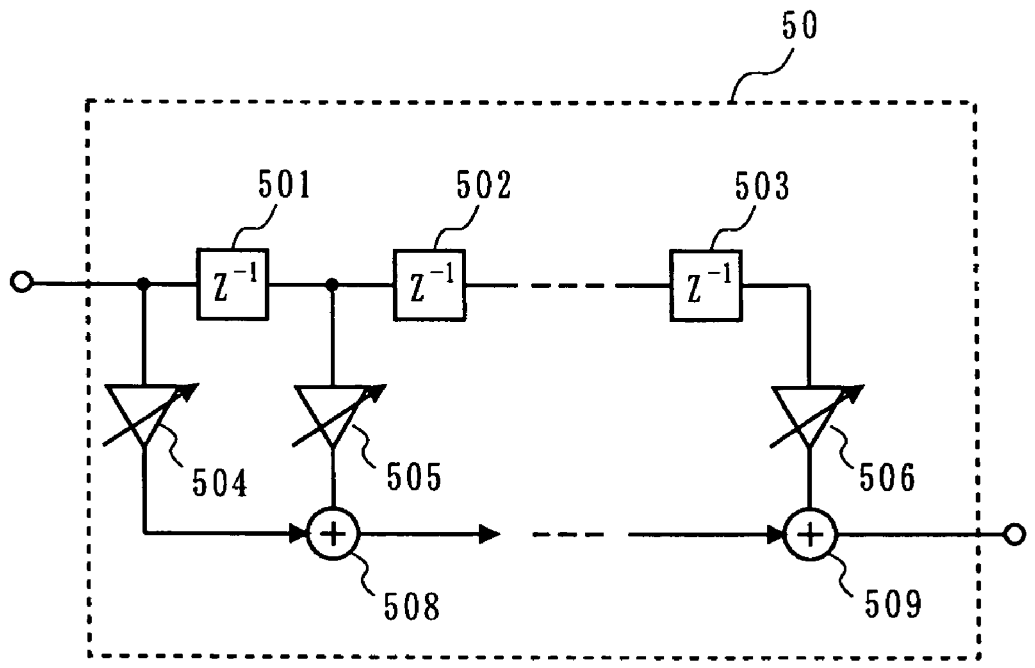
FIG. 5 is an illustration showing an exemplary structure of a time-variant coefficient filter section 50.
Figure 6:
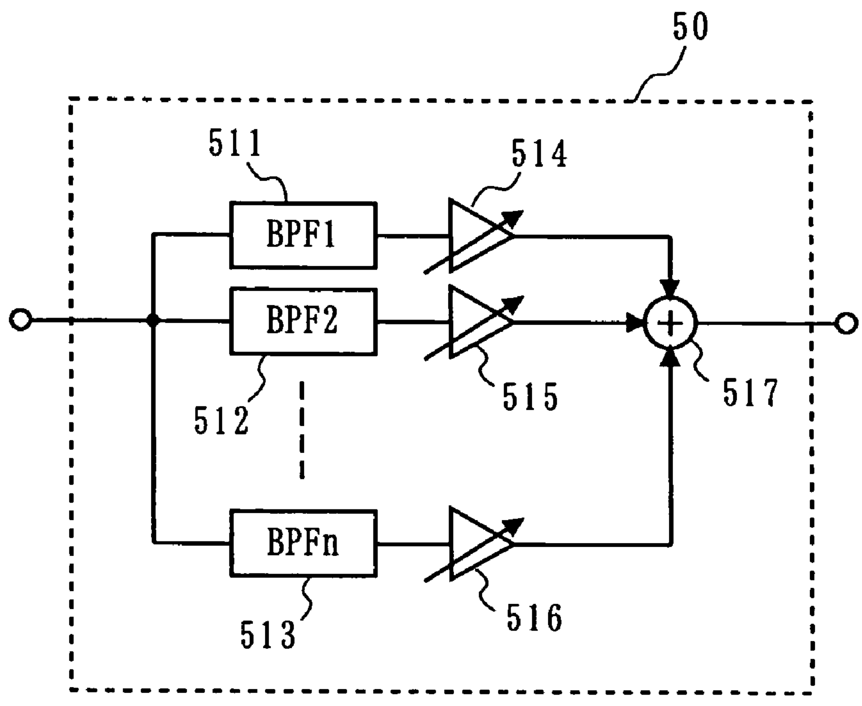
FIG. 6 is an illustration showing another exemplary structure of the time-variant coefficient filter section 50.

The time-variant coefficient filter section 50 performs a filtering process on the signal m1 in accordance with the filter coefficient hw(n) output from the impulse response designing section 47 to generate an output signal y of the microphone device. With reference to FIGS. 5 and 6, a specific example of the structure of the time-variant coefficient filter section 50 is described below.

FIG. 5 is an illustration of an exemplary structure of the time-variant coefficient filter section 50. In FIG. 5, the time-variant coefficient filter section 50 includes n signal delaying sections, n+1 signal amplifying sections, and n signal adding sections. Note that FIG. 5 illustrates, byway of example, a first signal delaying section 501, a second signal delaying section 502, an n-th signal delaying section 503, a first signal amplifying section 504, a second signal amplifying section 505, an n-th signal amplifying section 506, a first signal adding section 508, and an n-th signal adding section 509.

In FIG. 5, each signal delaying section is connected in series to each other for delaying a received signal by one sample. Each signal amplifying section amplifies a received signal for output. The first signal amplifying section 504 amplifies the signal m1 supplied to the time-variant coefficient filter section 50. The second signal amplifying section 505 amplifies a signal output from the first signal delaying section 501. The other signal amplifying sections subsequent to the second signal amplifying section 505 perform an operation similar to that performed by the second signal amplifying section 505. That is, an (i+1)-th (i is an integer of 1 through n) signal amplifying section amplifies a signal output from an i-th signal delaying section. The first signal adding section 508 adds a signal output from the first amplifying section 504 and a signal output from the second signal amplifying section 505 together. A second signal adding section (not shown) adds a signal output from the first signal adding section 508 and a signal output from a third signal amplifying section (not shown) together. The signal adding sections subsequent to the second signal adding section perform an operation similar to that performed by the second signal adding section. That is, a j-th (j is an integer of 2 through n) signal adding section adds a signal output from a (j−1)-th signal adding section and a signal output from an (i+1)-th signal amplifying section. Then, a signal output from the n-th signal adding section 509 represents the output signal y. Note that FIG. 5 illustrates the structure of a general FIR-type filter, and the coefficients of the first through (n+1)-th signal amplifying sections are changed according to the filter coefficient hw(n) from the impulse response designing section 47.

FIG. 6 is an illustration of another exemplary structure of the time-variant coefficient filter section 50. In FIG. 6, the time-variant coefficient filter section 50 includes n band-pass filters, n signal amplifying sections, and a signal adding section 517. Note that FIG. 6 illustrates, by way of example, a first band-pass filter 511, a second band-pass filter 512, an n-th band-pass filter 513, a first signal amplifying section 514, a second signal amplifying section 515, an n-th signal amplifying section 516, and the signal adding section 517.

In FIG. 6, the band-pass filters are placed in parallel at a later input signal stage for dividing a band of the signal m1 supplied to the time-variant coefficient filter section 50 by n for output. Each signal amplifying section amplifies a signal output from the corresponding band-pass filter. The signal adding section 517 adds signals output from the signal amplifying sections, and then outputs the addition result as the output signal y. Note that an amplification factor of each signal amplifying section can be determined based on the transfer function Hw(ω) output from the filter transfer characteristic estimating section 46. Also with this structure, the same effects as those described with reference to FIG. 5 can be obtained.

Figure 7:
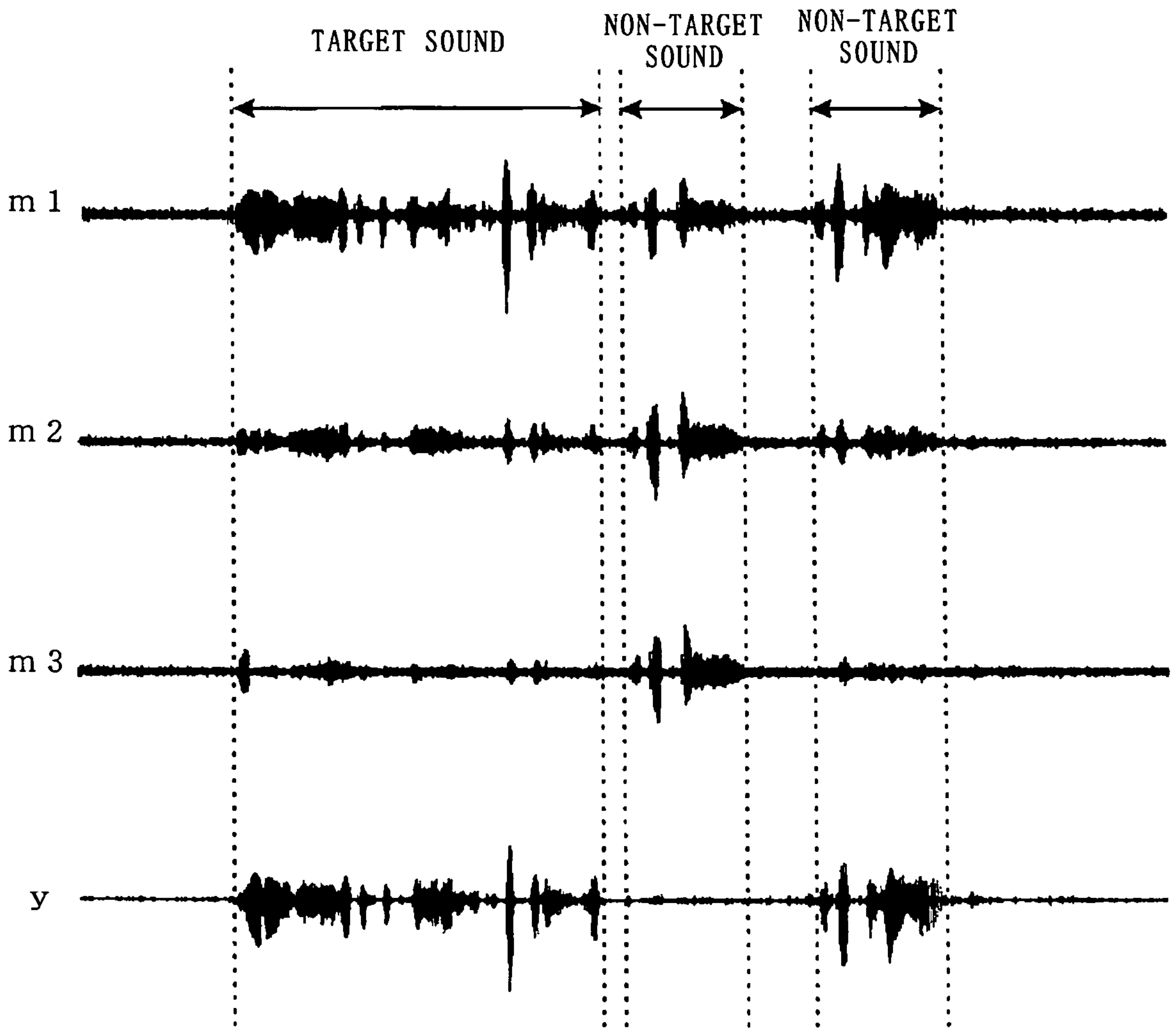
FIG. 7 is an illustration showing specific examples of signals illustrated in FIG. 1.

FIG. 7 is an illustration showing specific examples of signals illustrated in FIG. 1. Specifically, illustrated are specific examples of the signal m1 output from the first microphone unit 1, the signal m2 output from the second microphone unit 2, the signal m3 output from the first signal subtracting section 30, and the output signal y output from the time-variant coefficient filter section 50. As illustrated in FIG. 7, the signal m3 is a signal including only the components of sounds other than the target sound, that is, the components of noise, with the influence of the reflected sound or the like being suppressed from the signal m2. Furthermore, with a filtering process being performed by the time-variant coefficient filtering section 50 by using the main signal m1 and the noise reference signal m3, only the target sound can be extracted as the output signal y. As evident from comparison of the signal m1, which is an output from a conventional directional microphone unit, and the output signal y of the microphone device according to Embodiment 1, the surrounding noise can be significantly suppressed in the microphone device according to Embodiment 1, irrespectively of whether the target sound is being produced or not.

Depending on the positional relationship between the first and second microphone units 1 and 2 or circuits provided at a later stage of each of the microphone units 1 and 2, a signal delaying section can be provided between the signal subtracting section 30 and the second microphone unit 2 in order to satisfy the causality for adaptive filter convergence. The amount of delay in this signal delaying section is determined so as to, as a guide, be equal to or larger than an amount obtained by dividing a distance between the first and second microphone units 1 and 2 by the speed of sound.

Furthermore, although a unidirectional microphone unit is used as the first microphone unit 1 in Embodiment 1, a non-directional or ultradirectional microphone can also be used.

In Example 1, the determining section 10 outputs, as the determination result Vx, a numerical value represented by a binary value. Here, the determining section 10 can output the signal ratio Va represented by a multilevel value. Moreover, in this case, the adaptive filter section 20 varies the speed of learning in accordance with the determination result (signal ratio Va). Specifically, when the signal ratio Va is larger than a threshold value, the adaptive filter section 20 increases the speed of learning as the signal ratio Va is larger. More specifically, as the signal ratio Va increases, the value of a step gain parameter is approximated more to 0.5. On the other hand, when the signal ratio Va is equal to or smaller than the threshold value, the adaptive filter section 20 does not perform a learning process. In other words, the value of the step gain parameter is set to 0.

As described above, the microphone device according to Embodiment 1 can obtain an ideal noise reference signal even in a noisy environment or a reflective sound field. Therefore, with the noise suppressing section using the main signal and the noise reference signal, an S/N ratio in sound collection can be significantly improved compared with conventional directional microphone devices. Furthermore, by adopting a scheme using a time-variant coefficient filter as a noise suppressing scheme, the microphone device according to Embodiment 1 can reduce a process delay compared with a case where a spectrum subtraction scheme is employed. Therefore, the microphone device according to Embodiment 1 can also be applied so as to achieve purposes requiring less delays, such as being used for loudspeakers or calling.

Embodiment 2

Figure 8:
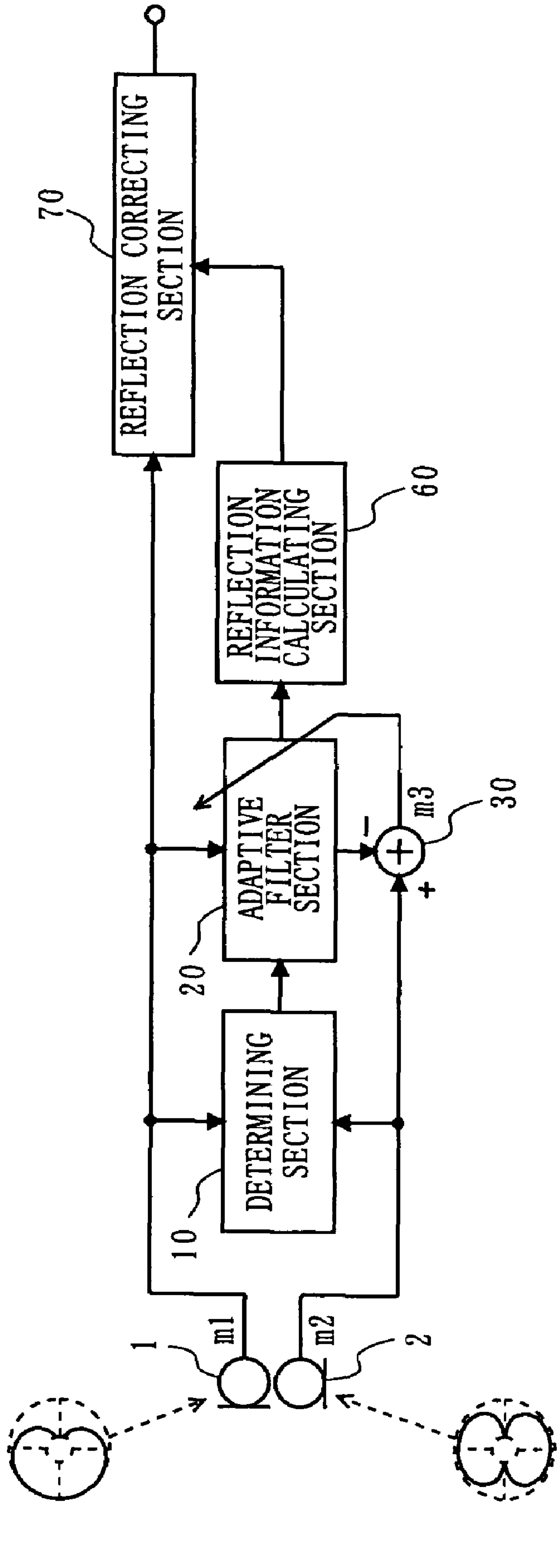
FIG. 8 is a block diagram illustrating the configuration of a microphone device according to Embodiment 2.
Figure 9:
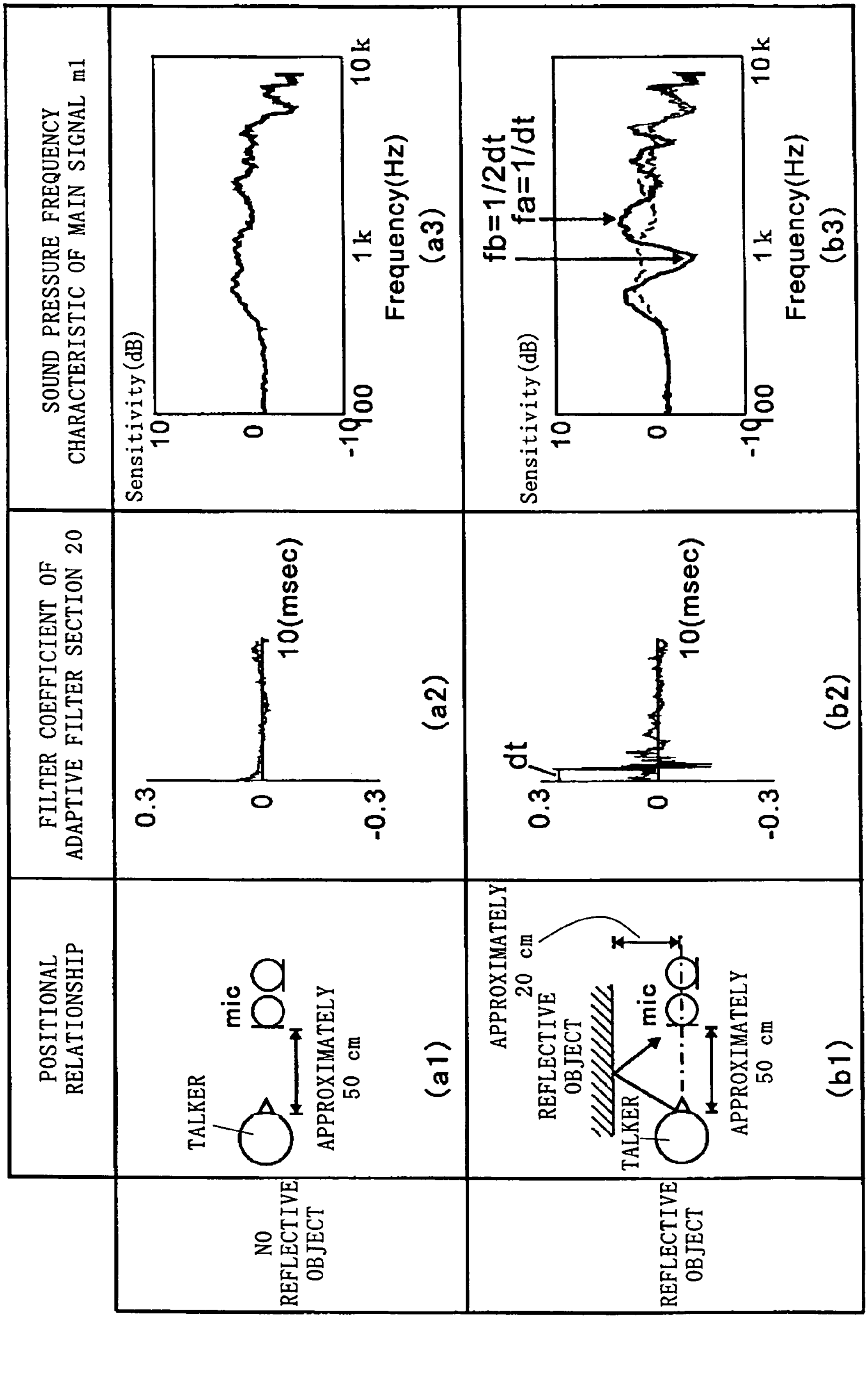
FIG. 9 is an illustration for describing differences in the internal state of the microphone device when there is a reflective object and when there is no reflective object.

With reference to FIGS. 8 and 9, a microphone device according to Embodiment 2 is described below. In contrast of an object of the microphone device according to Embodiment 1, which is to suppress the included noise when detecting the target sound, an object of the microphone device according to Embodiment 2 is to correct distortion in frequency characteristic of the target sound caused by a detected reflected wave of the target sound.

In FIG. 8, the microphone device includes a first microphone unit 1, a second microphone unit 2, a determining section 10, an adaptive filter section 20, a signal subtracting section 30, a reflection information calculating section 60, and a reflection correcting section 70. Note that, in FIG. 8, components similar in structure to those in Embodiment 1 are provided with the same reference numerals, and are not described in detail herein.

In FIG. 8, the reflection information calculating section 60 is supplied with the filter coefficient of the adaptive filter section 20. By using the received filter coefficient, the reflection information calculating section 60 estimates the presence or absence of a reflective object, a distance to a reflective object if any, and the degree of influence of the reflective object if any. The reflection correcting section 70 receives the signal m1 and, based on the estimation result of the reflection information calculating section 60, corrects distortion in frequency characteristic occurring in the signal m1 caused by the influence of reflection of the target sound.

The operation of the microphone device according to Embodiment 2 is now described below.

In the microphone device illustrated in FIG. 8, the signal m1 is the main signal. Here, when the directivity of the first microphone unit 1 is unidirectional, such directivity is not so sharp as to be able to eliminate a reflected wave of the target sound. Therefore, when a reflective object is located in the vicinity of the microphone device, the reflected wave and the direct wave of the target sound are simultaneously collected, thereby causing distortion in frequency characteristic of the detected sound due to interference between the direct wave and the reflected wave of the target sound. By using the fact that information about the reflected wave appears in the filter coefficient of the adaptive filter section 20, the microphone device according to Embodiment 2 corrects the frequency distorted by the influence of the reflection of the target sound. This makes it possible to automatically correct the frequency characteristic of the detected sound.

As described above, the adaptive filter section 20 generates a signal of the remaining components of the target sound that have not been completely suppressed due to incomplete directivity, that is, a signal of the components of the reflected wave of the target sound. In other words, the transfer characteristic (impulse response) between the signal m1 including components of the direct wave of the target sound and the signal m2 including components of the reflected wave of the target sound is represented by the filter coefficient of the adaptive filter section 20. Therefore, by detecting a peak of the filter coefficient, it is possible to ascertain a time difference dt (sec) at the location of the microphone units between a time when the direct wave of the target sound arrives and a time when the reflected wave arrives, a peak level Lr representing the reflected wave, and the intensity of reflection. Furthermore, from the time difference dt, it is possible to know a distance difference dt×c (where c is the speed of sound) between a route through which the reflected wave of the target sound arrives and a route through which the direct wave arrives.

Here, as for a sound having a frequency whose wavelength is equal to the distance difference (a wavelength λ satisfies a relationship of $\lambda=dt\times c$), the direct wave and the reflected wave are added together in phase. Therefore, a sound pressure level detected by the microphone unit is increased. Conversely, as for a sound having a frequency whose wavelength is equal to half of the distance difference (the wavelength λ satisfies a relationship of $\lambda/2=dt\times c$), the direct wave and the reflected wave are in opposite phase. Therefore, the sound pressure level detected by the microphone unit is decreased, and a dip occurs in the frequency characteristic of the main signal. If perfect reflection occurs on a surface of reflection, a frequency characteristic where a harmonic portion whose basic frequency is fa ($=c/\lambda=1/dt$) is enhanced appears in the signal output from the first microphone unit 1, such as the frequency characteristic of a comb filter.

FIG. 9 is an illustration for describing differences in the internal state of the microphone device when there is a reflective object and when there is no reflective object. FIG. 9 illustrates, for each of the case where there is a reflective object and the case where there is no reflective object, a positional relationship among the microphone units, a target sound source (talker), and the reflective object, values of an adaptive filter had f(n) in the adaptive filter section 20, and the frequency characteristic of the signal m1.

In FIG. 9, in a state as illustrated in (a1) where there is no reflective object in the vicinity of the talker or the microphone units, no influence of a reflected wave occurs to the filter coefficient of the adaptive filter section 20, as illustrated in (a2). Also, as illustrated in (a3), the shape of the frequency characteristic of the main signal is relatively flat. On the other hand, in a state as illustrated in (b1) where there is a reflective object in the vicinity of the talker and the microphone units, the value of the filter coefficient of the adaptive filter section 20 is increased in a segment of the time difference dt, as illustrated in (b2). Also, as illustrated in (b3), distortion occurs in the frequency characteristic of the main signal correspondingly to the above-stated positional relationship.

As such, from the peak of the coefficient of the adaptive filter, the above time difference dt and the degree of influence Lr can be calculated. Furthermore, by using these calculation results, the amount of correction of the frequency characteristic distorted by the influence of the reflected wave can be estimated. In practice, particularly in high frequencies, perfect reflection on the surface of reflection cannot be regarded as occurring. One way of coping with this is that a reflection characteristic of the surface of reflection is hypothesized for deconvolution filter design. Another way is that, by focusing, for the meantime, on only a low-frequency characteristic, corrected gains are calculated for a frequency, such as a frequency of fa whose wavelength is equal to the distance difference (fa=1/dt) or a frequency of fb whose wavelength is equal to a half of the distance difference (fb=½dt), by using the following equations, for example.

$$\text{Center frequency fa: Correctedgain}=-\beta 1\cdot 20\log(1+\alpha 1\cdot Lr)(dB)$$

$$\text{Center frequency fb: Correctedgain}=+\beta 2\cdot 20\log(1-\alpha 2\cdot Lr)(dB)$$

In this case, a correction characteristic Hr(ω) of the reflection correction section 70 can be achieved by using an equalizer capable of adjusting the center frequency, the bandwidth, and the gain based on the information from the reflection information calculating section 60.

In a case where the use environment of the microphone device can be restricted, such as a case where the microphone device is used for voice recognition in car navigation, the accuracy of detecting the filter coefficient of the adaptive filter section 20 can be increased. Specifically, only initial reflection components are considered and, based on the calculated amount of delay of the reflected wave on the surface of reflection, the range to be searched for a maximum value of the filter coefficient is limited.

As for the maximum value of the filter coefficient, according to the directivity type of the microphone unit, the side, which is either one of the positive and negative sides, where a peak due to the reflected wave occurs the polarity of a directional lobe, may depend on a direction from which the reflected wave comes. In that case, a search for the maximum value is performed with respect to the absolute value of the filter coefficient.

As described above, according to Embodiment 2, it is possible to correct the frequency characteristic distorted by the influence of the reflected wave of the target sound. Therefore, it is possible to achieve a microphone device in which a stable, flat frequency characteristic with respect to the sound pressure sensitivity can be obtained in any use environment (sound field) Thus, according to Embodiment 2, sound quality can be improved for calling and loudspeakers. Furthermore, particularly for the purpose of voice recognition, distortion in frequency characteristic caused by the reflected wave has been a culprit for erroneous recognition. With the structure according to Embodiment 2, it is possible to stably achieve a high voice recognition ratio irrespectively of whether there is a reflective object nearby.

Embodiment 3

Figure 10:
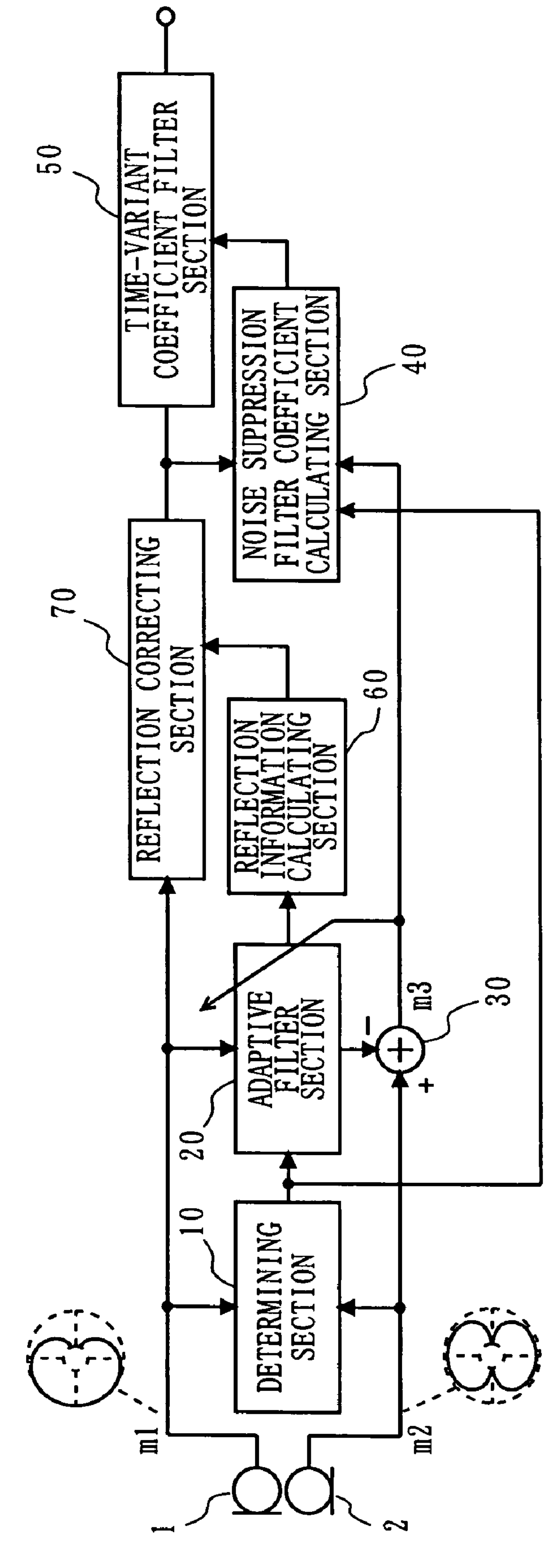
FIG. 10 is a block diagram illustrating one configuration of a microphone device according to Embodiment 3.
Figure 11:
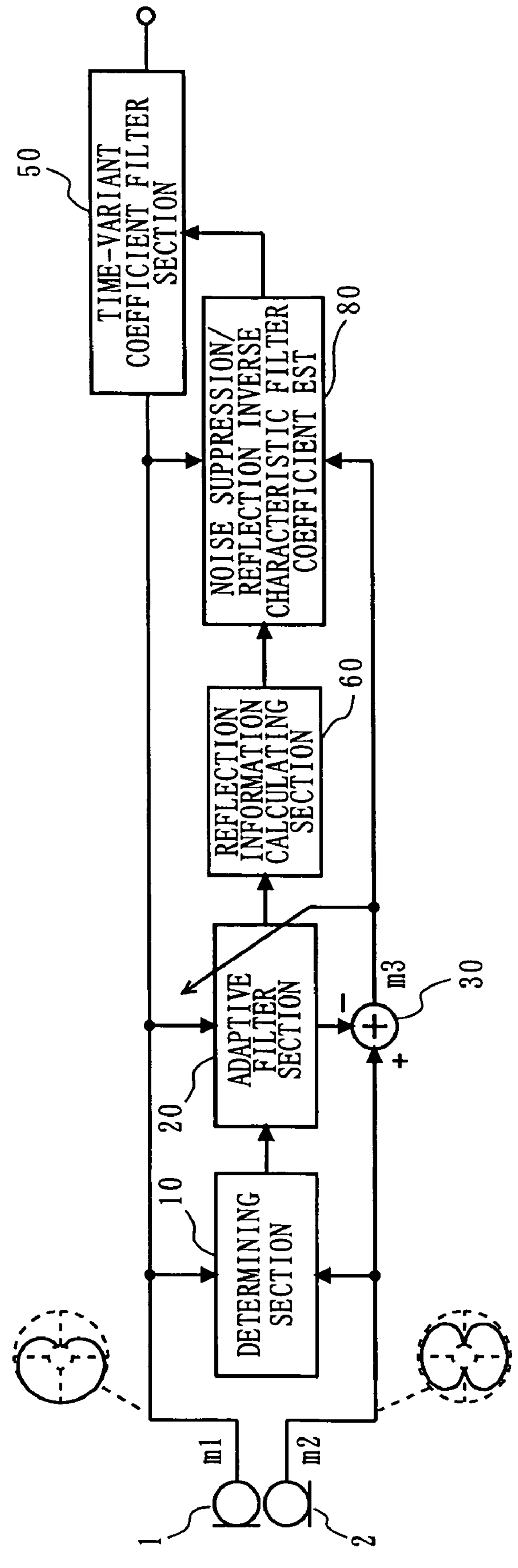
FIG. 11 is a block diagram illustrating another configuration of the microphone device according to Embodiment 3.

With reference to FIGS. 10 and 11, a microphone device according to Embodiment 3 is described below. The microphone device according to Embodiment 3 has a structure such that the structures of Embodiment 1 and 2 are combined.

FIG. 10 is a block diagram illustrating one example of the configuration of the microphone device according to Embodiment 3. In FIG. 10, the microphone device includes a first microphone unit 1, a second microphone unit 2, a determining section 10, an adaptive filter section 20, a signal subtracting section 30, a noise suppression filter coefficient calculating section 40, a time-variant coefficient filter section 50, a reflection information calculating section 60, and a reflection correcting section 70. Note that, in FIG. 10, components similar in structure to those in Embodiment 1 or 2 are provided with the same reference numerals, and are not described in detail herein.

The structure illustrated in FIG. 10 is different from that illustrated in FIG. 8 in that the noise suppression filter coefficient calculating section 40 and the time-variant coefficient filter section 50 illustrated in FIG. 1 are provided at a later stage of the structure illustrated in FIG. 8. With this structure, the microphone device illustrated in FIG. 10 can correct distortion in frequency characteristic caused by the reflected wave and also can suppress noise.

FIG. 11 is a block diagram illustrating another example of the configuration of the microphone device according to Embodiment 3. In FIG. 11, the microphone device includes a first microphone unit 1, a second microphone unit 2, a determining section 10, an adaptive filter section 20, a signal subtracting section 30, a time-variant coefficient filter section 50, a reflection information calculating section 60, a reflection correcting section 70, and a noise suppression/reflection inverse characteristic filter coefficient estimating section 80. In the structure illustrated in FIG. 11, the characteristic of the reflection correcting section 70 is superimposed on the characteristic of the time-variant coefficient filter section 50, thereby reducing the amount of processes.

The operation of the microphone device illustrated in FIG. 11 is different from that illustrated in FIG. 10 in the operation of the noise suppression/reflection inverse characteristic filter coefficient estimating section 80. This estimating section 80 is supplied with the signal m1 (main signal), the signal m3 (noise reference signal), and a signal output from the reflection information calculating section 60. Then, based on these signals, a noise suppression filter characteristic Hw(ω) (=(X(ω)−Nx(ω)/X(ω)) and a reflection inverse characteristic Hr(ω) are calculated. Furthermore, a filter coefficient whose target characteristic is {Hw(ω)·Hr(ω)} is output to the time-variant coefficient filter section 50. With this, it is possible to simultaneously perform both of a process of correcting distortion in frequency characteristic caused by the reflected wave and a process of suppressing noise.

As described above, according to Embodiment 3, as with Embodiment 1, an ideal noise reference signal with the target sound being suppressed can be obtained. Also, as with Embodiment 2, it is possible to simultaneously perform a two-input-type noise suppressing process by using the main signal and the noise reference signal and a process of correcting distortion in frequency characteristic caused by the influence of the reflected wave. Consequently, even in a noisy surrounding environment or a reflected sound field, a flat frequency characteristic having a high S/N ratio can be obtained. This offers an effect of improving voice quality in calling or loudspeakers and an effect of improving a voice recognition ratio.

Embodiment 4

With reference to FIGS. 12 and 13A through 13C, a microphone device according to Embodiment 4 is described below.

In Embodiment 4, of all directions of sounds that arrive at the microphone device, only a direction of an assumed target sound is changed.

Figure 12:
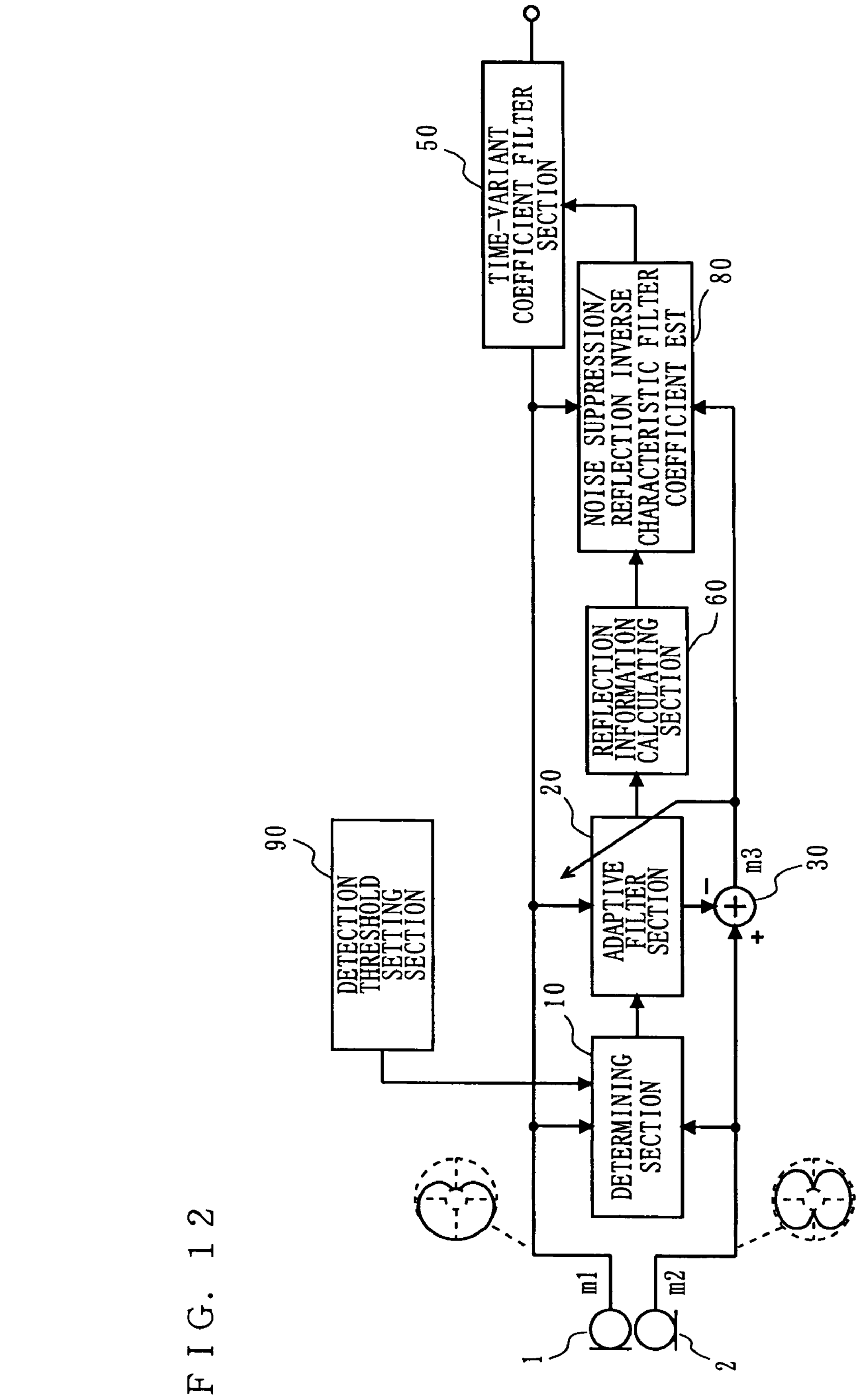
FIG. 12 is a block diagram illustrating the configuration of a microphone device according to Embodiment 4 of the present invention.

FIG. 12 is a block diagram illustrating the configuration of the microphone device according to Embodiment 4. In FIG. 12, the microphone device further includes a detection threshold setting section 90 in addition to the components illustrated in FIG. 11. Note that, in FIG. 12, components similar in structure to those in Embodiment 3 are provided with the same reference numerals as those illustrated in FIG. 11, and are not described in detail herein.

The detection threshold setting section 90 sets a threshold value used in the determining section 10. The microphone device according to Embodiment 4 is different from that according to Embodiment 3 in that the threshold value set in the determining section 10 is controllable.

In FIG. 12, the threshold value set in the determining section 10 can be changed. With the threshold value being changed, a range of angles formed on both sides of the front direction can be changed. That is, the range of angles for target sound collection can be controlled.

For example, consider a case where the above threshold value is set as th1 by the detection threshold setting section 90 (refer to FIG. 3). In this case, a sound coming from the direction of θ1 (refer to FIGS. 2 and 3) is not regarded as the target sound. That is, the sound coming from the direction of θ1 is regarded as noise. Also, a component of the sound coming from the direction of θ1 is included in the signal m3. Consequently, in the final output, the sound coming from the direction of θ1 is suppressed.

On the other hand, in a case where the threshold value is set as th2 (refer to FIG. 3), the sound coming from the direction of θ1 is regarded as the target sound. In this case, the signal m3, which is the noise reference signal, does not include a component of the sound coming from the direction of θ1. Consequently, in the final output, the sound coming from the direction of θ1 is output as the target sound.

As described above, with the threshold value of the determining section 10 being controlled, it is possible to control the range of angles enabling the microphone device to collect sounds. However, the range of angles is limited to angles covering a direction of a minimum sensitivity in the directivity of the second microphone unit 2, that is, certain angles with respect to the front.

Figure 13A:
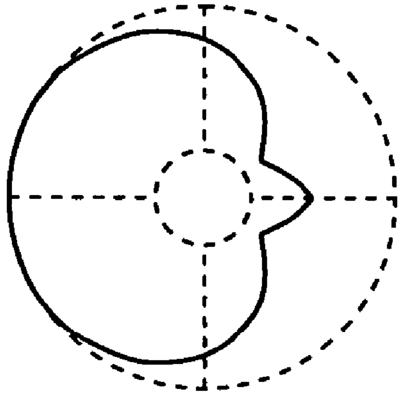
FIGS. 13A, 13B, and 13C are illustrations showing directivity patterns of the microphone device.
Figure 13B:
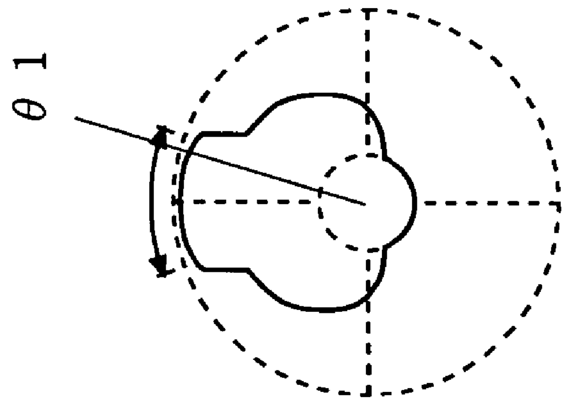
Figure 13C:
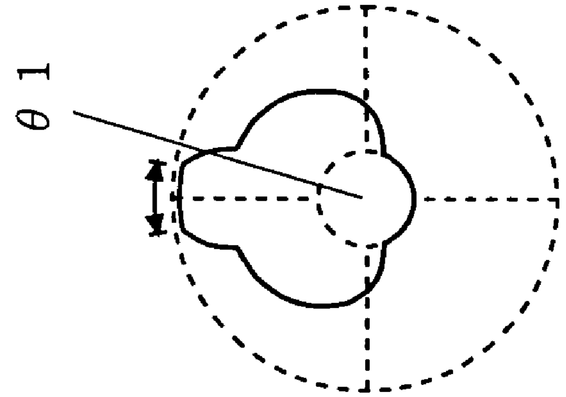

FIGS. 13A through 13C illustrate directivity patterns of the microphone device. In FIG. 13A, a directivity pattern of the signal m1 is illustrated. Furthermore, a directivity pattern tkof the output signal y of the microphone device when the threshold value is set as th2 is illustrated in FIG. 13B and a directivity pattern thereof when the threshold value is set as th1 is illustrated in FIG. 13C. The range of angles enabling the microphone device to collect sounds illustrated in FIG. 13B is wider than that illustrated in FIG. 13C. For example, when the threshold value is set as th2, the sound coming from the angle θ1 is determined as the target sound. On the other hand, sensitivity is significantly deteriorated in portions out of that range. In FIG. 13C, the range of angles enabling the microphone device to collect sounds is narrow, thereby achieving an extremely acute directivity characteristic. In this case, the sound coming from the angle θ1 is not determined as the target sound.

As described above, according to Embodiment 4, with the threshold value of the determining section 10 being changed, the acuteness of the directivity of the microphone device can be changed. In general, in the directivity of the microphone device, it is more difficult to form an acute main beam than to form an acute range of directions of a minimum sensitivity in the directivity. However, according to Embodiment 4, it is possible to achieve an unprecedented microphone device having acute directivity.

In practice, the more the acuteness of the directivity, the less the usability of the microphone device. When using a microphone device having acute directivity, the user has to always keep the front direction in mind. In order to achieve both of high usability and high noise suppressing capability, the microphone device preferably has a directivity characteristic such that a certain sensitivity characteristic is maintained from the front up to a certain range of angles but, for the other directions, sensitivity is significantly attenuated. Furthermore, preferably, the sound-collectable range of angles can be freely set in accordance with the purpose of the microphone device or the state of sound collection. According to Embodiment 4, the directivity of the microphone device is changed as illustrated in FIGS. 13A through 13C. As evident from FIGS. 13A through 13C, the microphone device according to Embodiment 4 can achieve both of high usability as the microphone device and high noise suppressing capability.

Embodiment 5

Figure 14:
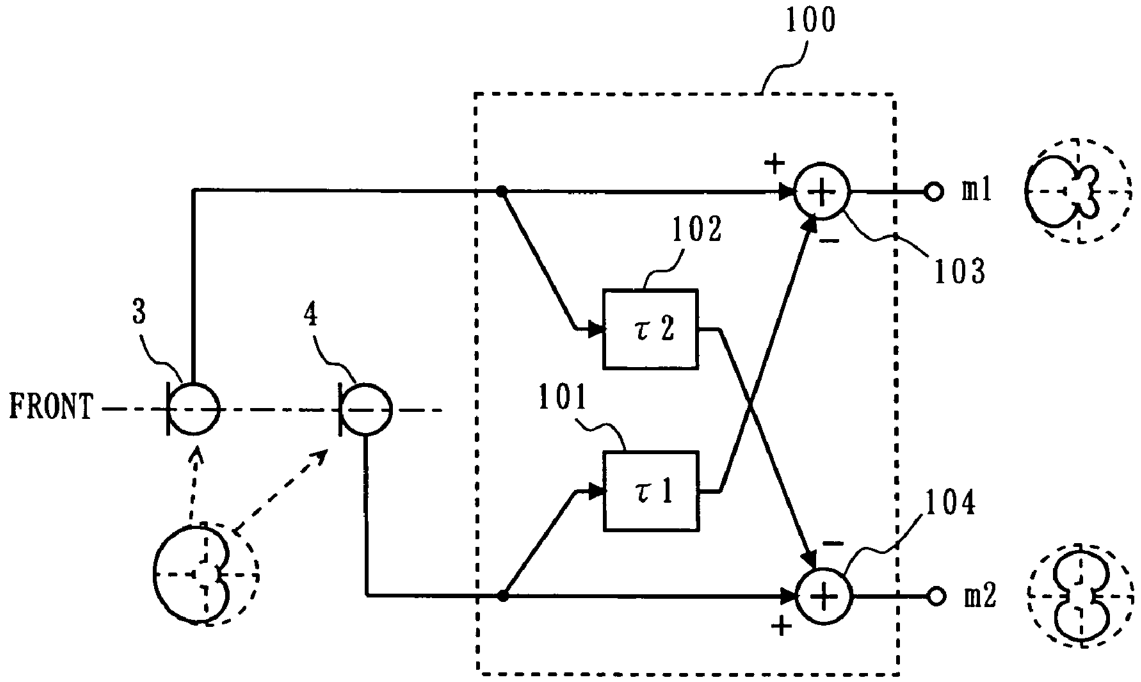
FIG. 14 is an illustration showing a part of the configuration of a microphone device according to Embodiment 5.

With reference to FIG. 14, a microphone device according to Embodiment 5 is described below. The microphone devices according to Embodiments 1 through 4 have a structure in which a unidirectional microphone unit and a bidirectional microphone unit are placed closely to each other, and signals output from these microphone units are taken as the main signal and the noise reference signal. This structure has advantages such that the microphone device can be made small, and also can be achieved at low cost because a directivity combining process, for example, is not required.

Meanwhile, a device, such as a video recorder, capable of collecting sounds, often use a plurality of microphone units having non-directivity or directivity of the same characteristic to obtain directivity by combining signals output from these microphone units. In such a directivity combining process, the microphone units are required to be a certain distance (normally, 1 cm to 5 cm) apart from each other for mitigating a problem of circuit noise or others. Therefore, such a device performing a directivity combining process is somewhat disadvantageous over the devices according to Embodiments 1 through 4 for size reduction. However, the device performing a directivity combining process is practically advantageous in that, for example, flexibility in designing directivity is high and a variable characteristic using a digital process can be used.

In Embodiment 5, a plurality (two in Embodiment 5) of microphone units having the same directivity characteristic and a directivity combining section 100 are employed to obtain a main signal equivalent to the above signal m1 and a noise reference signal equivalent to the above signal m2.

FIG. 14 is an illustration showing a part of the configuration of the microphone device according to Embodiment 5. In FIG. 14, the microphone device includes a third microphone unit 3, a fourth microphone unit 4, and the directivity combining section 100. Note that, after the stages of obtaining the signal m1 and the signal m2, any one of the structures according to Embodiments 1 through 4 is applied.

In FIG. 14, the microphone units 3 and 4 are placed on an axis directed to the front (denoted by a one-dot chain line in FIG. 14). These microphone units 3 and 4 have a distance of d. Each of the microphone units 3 and 4 are placed so that its main axis of directivity is oriented to the front.

The directivity combining section 100 includes a first signal delaying section 101, a first signal subtracting section 103, a second signal delaying section 102, and a second signal subtracting section 104. The first signal delaying 101 delays a signal output from the fourth microphone unit 4. The second signal delaying 102 delays a signal output from the third microphone unit 3. The first signal subtracting section 103 subtracts a signal output from the first signal delaying section 101 from an output from the third microphone unit 3, thereby obtaining the signal m1. The second signal subtracting section 104 subtracts a signal output from the second signal delaying section 102 from an output from the fourth microphone unit 4, thereby obtaining the signal m2.

Also, by setting a delay amount $\tau 1$ of the first signal delaying section 101 so as to satisfy $0 \leqq \tau 1 \leqq d/c$ (where c is the speed of sound), an ultradirectional characteristic of a secondary sound pressure gradient type in which the main axis of directivity is oriented to the front can be achieved as the signal m1. Also, by setting a delay amount of $\tau 2$ of the first signal delaying section 102 so as to satisfy $\tau 2 = d/c$, it is possible to obtain the signal m2 with which a direction of a minimum sensitivity in the directivity is oriented to the front (that is, a signal obtained from a result coming from the microphone unit whose direction of a minimum sensitivity in the directivity is oriented to the front direction).

With the above structure, by achieving an ultradirectional characteristic in advance in the signal m1 and also performing a noise suppression process at later stages, it is possible to achieve acute directivity and noise suppression capability that are significantly improved compared with conventional ultradirectional microphone devices.

Embodiment 6

Figure 15:
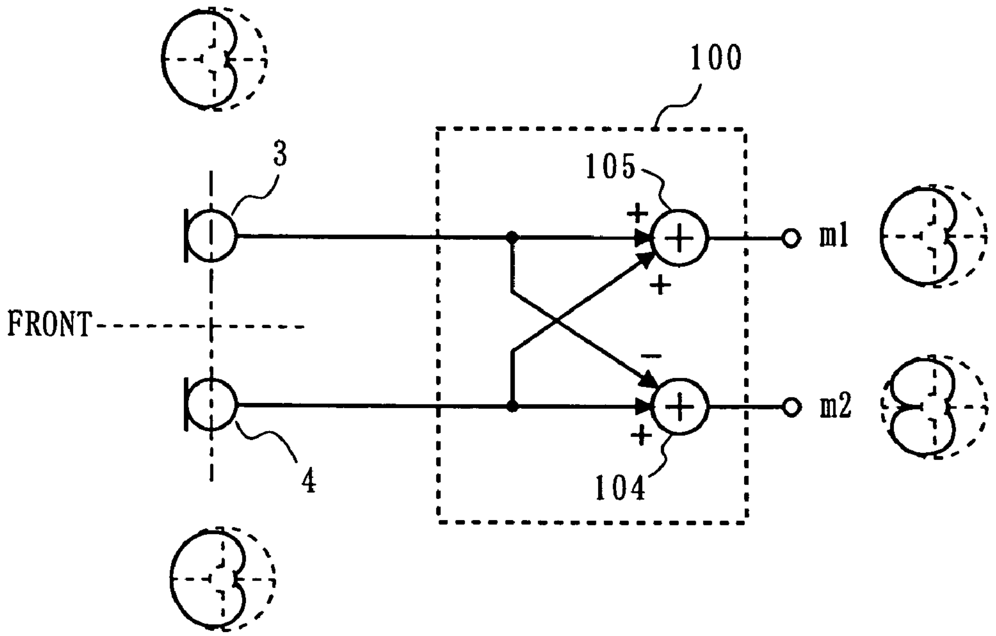
FIG. 15 is an illustration showing a part of the configuration of a microphone device according to Embodiment 6.

With reference to FIG. 15, a microphone device according to Embodiment 6 is described below. In Embodiment 6, as with Embodiment 5, a plurality of microphone units having the same directivity characteristic are used to obtain the main signal and the noise reference signal.

FIG. 15 is an illustration showing a part of the configuration of the microphone device according to Embodiment 6. The microphone device includes a third microphone unit 3, a fourth microphone unit 4, and a directivity combining section 100. The microphone units 3 and 4 are placed on an axis (denoted by a one-dot chain line in FIG. 15) perpendicular to a straight line oriented to the front (denoted by a dotted line in FIG. 15). Each of these microphone units 3 and 4 is placed so that its main axis of directivity is oriented to the front. Note that, after the stages of obtaining the signal m1 and the signal m2, any one of the structures according to Embodiments 1 through 4 is applied.

In FIG. 15, the directivity combining section 100 includes a first signal adding section 105 and a second signal subtracting section 104. The first signal adding section 105 adds signals output from the microphone units 3 and 4, thereby obtaining the signal m1, which is the main signal. The second signal subtracting section 104 subtracts the signal output from the third microphone unit 3 from the signal output from the fourth microphone unit 4, thereby obtaining the signal m2, which is the noise reference signal.

In FIG. 15, when the distance between the microphone units 3 and 4 is narrow to an extent, the directivity of the signal m1 is similar to that in a case where only a single microphone unit is used for obtaining the signal m1 (Embodiments 1 through 4), although the high-frequency characteristic is different from that in Embodiments 1 through 4. Therefore, in the structure illustrated in FIG. 15, the obtained directivity cannot be as acute as that obtained by the microphone device illustrated in FIG. 14. However, effects of reducing vibration noise and circuit noise can be achieved. Furthermore, the sound coming from the front is detected by each of the microphone units 3 and 4 as having the same phase, the signal m2 with which a direction of a minimum sensitivity in the directivity is oriented to the front can be obtained.

Embodiment 7

Figure 16B:
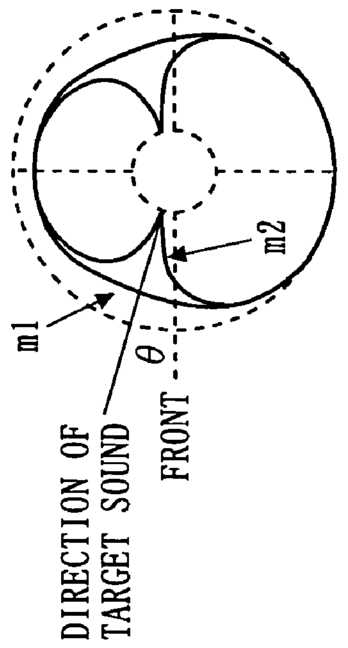
FIG. 16B is an illustration showing a directivity pattern of the microphone device.
Figure 16A:
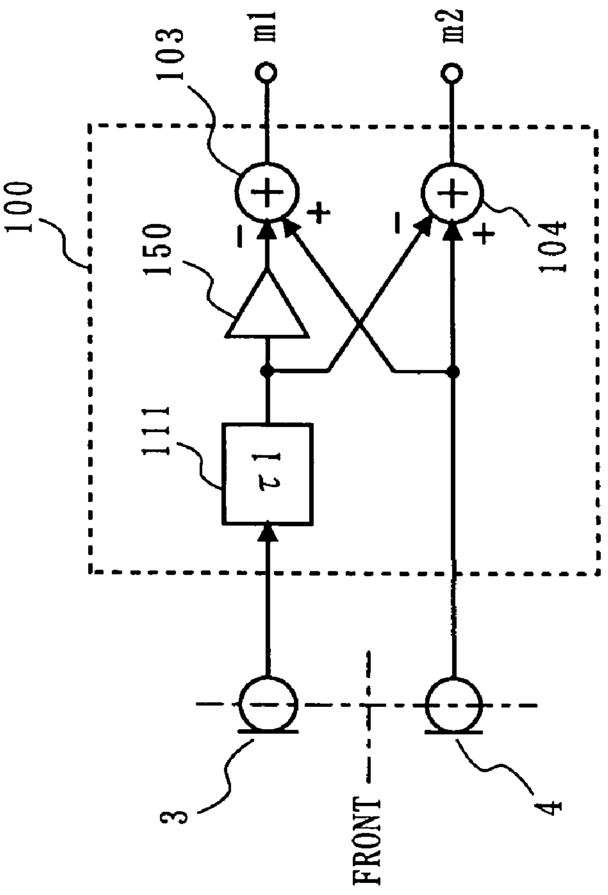
FIG. 16A is an illustration showing a part of the configuration of a microphone device according to Embodiment 7.

With reference to FIGS. 16A and 16B, a microphone device according to Embodiment 7 is described below. In Embodiment 7, as with Embodiment 5, a plurality of microphone units having the same directivity characteristic are used to obtain the main signal and the noise reference signal.

FIG. 16A is an illustration showing a part of the configuration of the microphone device according to Embodiment 7. The microphone device includes a third microphone unit 3, a fourth microphone unit 4, and a directivity combining section 100. The microphone units 3 and 4 are placed similarly to those illustrated in FIG. 15. Note that, after the stages of obtaining the signal m1 and the signal m2, any one of the structures according to Embodiments 1 through 4 is applied.

In FIG. 16A, the directivity combining section 100 includes a signal delaying section 111, a first signal subtracting section 103, a second signal subtracting section 104, and a signal amplifying section 150. The signal delaying section 111 delays a signal output from the third microphone unit 3. The second signal subtracting section 104 subtracts a signal output from the signal delaying section 111 from a signal output from the fourth microphone unit 4, thereby obtaining the signal m2, which is the noise reference signal. The signal amplifying section 150 performs constant multiplication of the signal output from the signal delaying section 111. The first signal subtracting section 103 subtracts a signal output from the signal amplifying section 150 from the signal output from the fourth microphone unit 4, thereby obtaining the signal m1, which is the main signal.

In FIG. 16A, a route for obtaining the signal m1 is different from a route for obtaining the signal m2 in that the signal amplifying section 150 is located in the route for obtaining the signal m1. Directions of a minimum sensitivity in the directivity of the signal m1 and the signal m2 are determined based on a delay amount $\tau 1$ of the signal delaying section 111. For example, when $\tau 1 = 0$, the directions of a minimum sensitivity in the directivity are located on the front. When $\tau 1 = d/c$, these directions are perpendicularly to the front. Here, the delay amount $\tau 1$ is determined so that the directions of a minimum sensitivity in the directivity are in the direction of the target sound. With this, the signals m1 and m2 include components of the sound coming from a direction other than the direction of the target sound more than components of the target sound.

Here, the directivity pattern formed by the directivity combining section 100 is preferably such that, as for the direction of the target sound, there is a large difference in sensitivity between the signals m1 and m2. On the other hand, as for the directions other than the direction of the target sound, it is preferable that there is no difference insensitivity therebetween. The reason is as follows. In order to suppress, based on the noise reference signal, noise components included in the main signal under the circumstances where noise is coming from a plurality of directions, the output of the spectrum ratio calculating section 43 illustrated in FIG. 4 has to be constant irrespectively of the direction from which noise is coming. That is, if the output of the spectrum ratio calculating section 43 is changed depending on the direction from which noise is coming, only the estimated noise spectrum $Nx(\omega)$ in a specific direction is correctly calculated. For this reason, it is preferable that the directivity patterns of the signals m1 and m2 be different in shape from each other only at the portions of directions of a minimum sensitivity in the directivity and be identical in shape to each other at other portions.

Here, when a subtracting operation is performed on each signal output from the microphone units 3 and 4, if the balance of sensitivity between the third and fourth microphone units is lost, the sensitivity at a zero point, that is, the sensitivity in a direction of a minimum sensitivity in the directivity, which requires the maximum accuracy, is increased. With the use of this characteristic, the signal amplifying section 150 is provided at the signal m1 side with its signal amplification ratio set at approximately 0.85, thereby achieving a directivity pattern as illustrated in FIG. 16B. In FIG. 16B, directivity patterns at the signals m1 and m2 shown in FIG. 16A are illustrated. As illustrated in FIG. 16B, according to Embodiment 7, it is possible to obtain directivity patterns that are different in shape from each other only in the direction of a minimum sensitivity in the directivity and are approximately identical in shape to each other in the other directions.

As described above, according to Embodiment 7, it is possible to obtain signals that are different in sensitivity characteristic only in the direction of the target sound. Therefore, an excellent suppressing effect can be obtained in the following noise suppressing process.

Embodiment 8

Figure 17A:
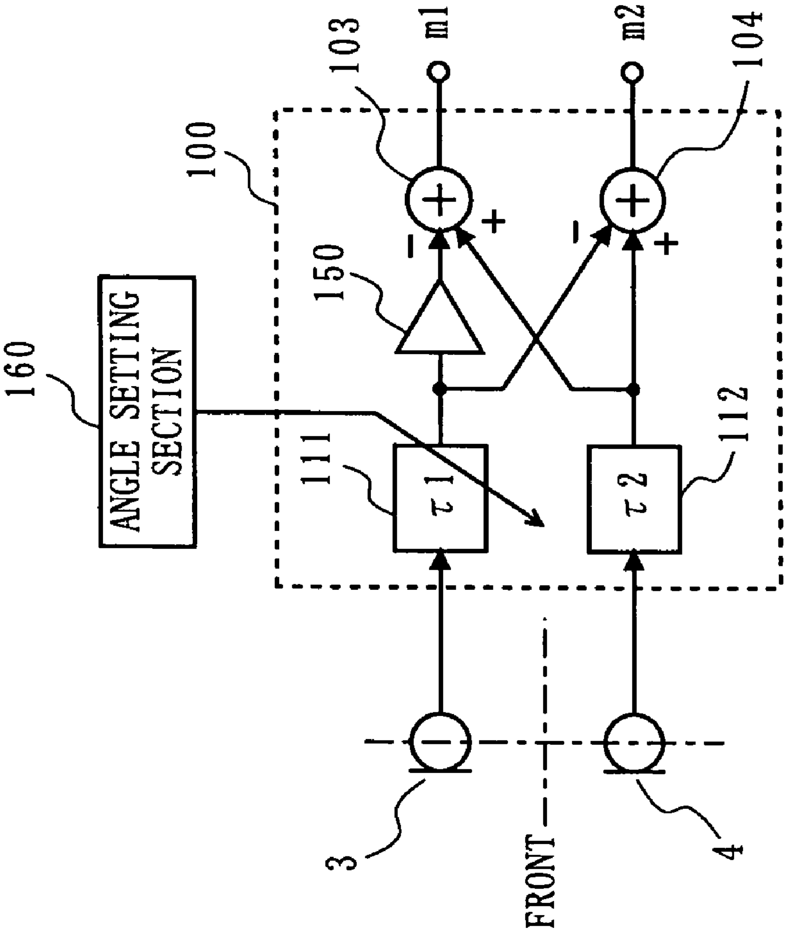
FIG. 17A is an illustration showing a part of the configuration of a microphone device according to Embodiment 8.
Figure 17B:
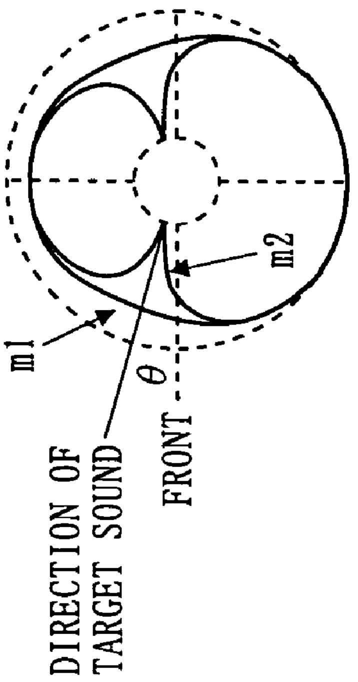
FIGS. 17B and 17C are illustrations showing directivity patterns of the microphone device.
Figure 17C:
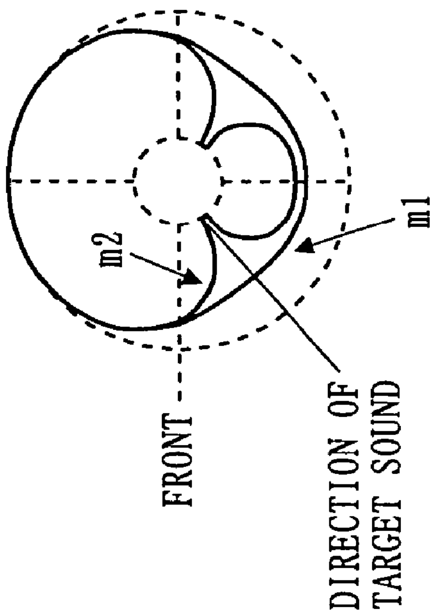

With reference to FIGS. 17A through 17C, a microphone device according to Embodiment 8 is described below. In Embodiment 8, as with Embodiment 5, a plurality of microphone units having the same directivity characteristic are used to obtain the main signal and the noise reference signal.

FIG. 17A is an illustration showing a part of the configuration of the microphone device according to Embodiment 8. In FIG. 17A, a directivity combining section 100 includes, in addition to the components of the directivity combining section 100 illustrated in FIG. 16A, an angle setting section 160 and a second signal delaying section 112. Note that, after the stages of obtaining the signal m1 and the signal m2, any one of the structures according to Embodiments 1 through 4 is applied.

The structure illustrated in FIG. 17A is different from that illustrated in FIG. 16A in that the angle setting section 160 is further provided and the second signal delaying section 112 is provided after the fourth microphone unit 4. The basic operation in FIG. 17A is similar to that in FIG. 16A, and therefore is not described herein, except that the target sound direction can be changed by the angle setting section 160.

The angle setting section 160 can change a signal delay amount $\tau 1$ of the first signal delaying section 111 in a range of $0 \leqq \tau 1 \leqq 2d/c$ (where d is a distance between the microphone units and c is the speed of sound). Here, if the second signal delaying section 112 is not provided, even with the signal delay amount $\tau 1$ of the first signal delaying section 111 being changed in the above range, the target sound direction can be changed merely in a range of 0 to +90 degrees with respect to the front direction. With the second signal delaying section 112 being provided and its signal delay amount $\tau 2$ being set as $\tau 2 = d/c$, the target sound direction can be changed in a range of ±90 degrees with respect to the front direction.

As described above, according to Embodiment 8, the direction of collecting sounds (the target sound direction) of the microphone device can be changed. For example, it is possible to achieve a directivity pattern illustrated in FIG. 17B, as well as a directivity pattern illustrated in FIG. 17C by changing the signal delay amount of the signal delay section. Note that this variable delay characteristic can be easily attained by forming the signal delaying section with an all-pass filter $H(w)=(A+z^{-1})/(a+A \cdot z^{-1})$ where a coefficient A is $0 \leqq A < 1$. To change the signal delay amount, the angle setting section 160 changes this coefficient A. If a large delay amount or a linear delay frequency characteristic is required, a secondary all-pass filter and/or an all-pass filter is subordinately connected.

Embodiment 9

Figure 18A:
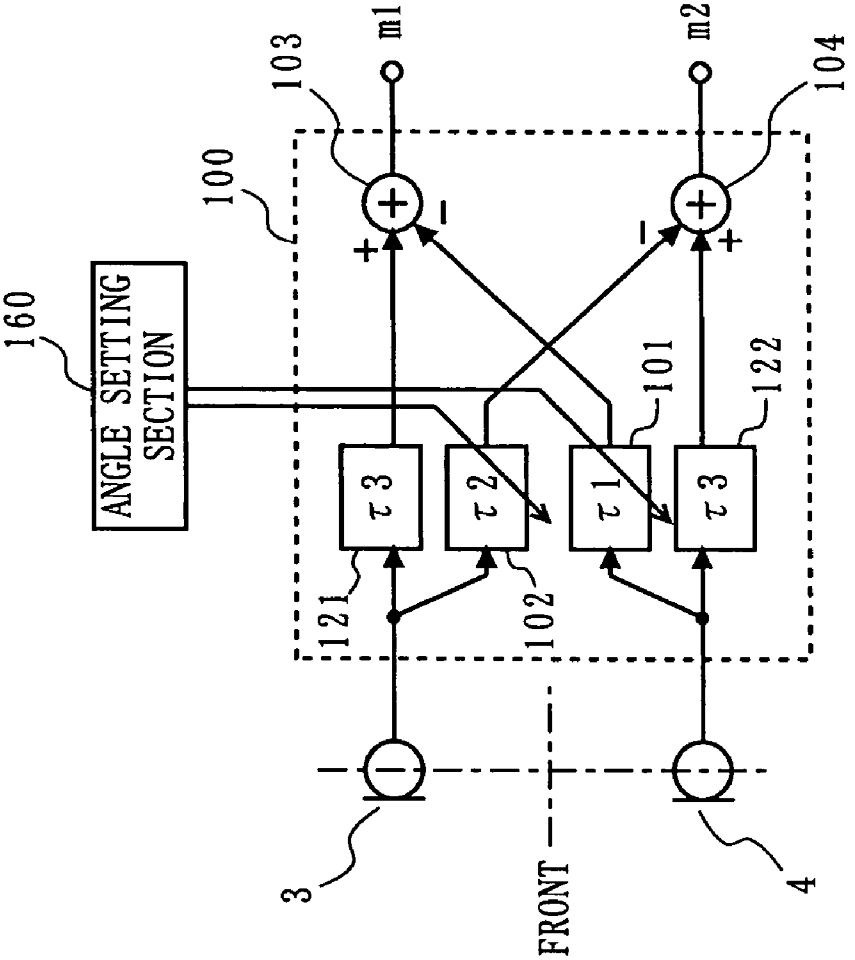
FIG. 18A is an illustration showing a part of the configuration of a microphone device according to Embodiment 9.
Figure 18B:
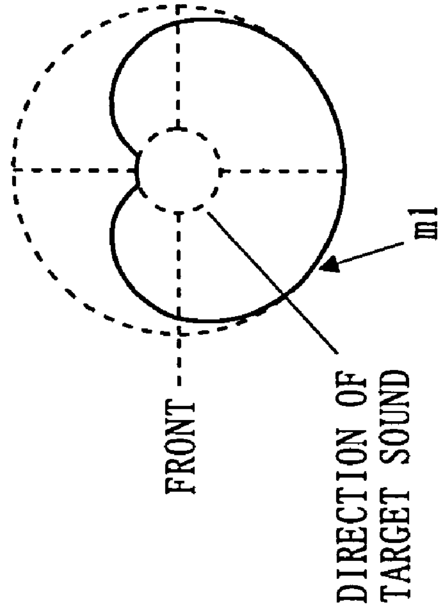
FIGS. 18B and 18C are illustrations showing directivity patterns of the microphone device.
Figure 18C:
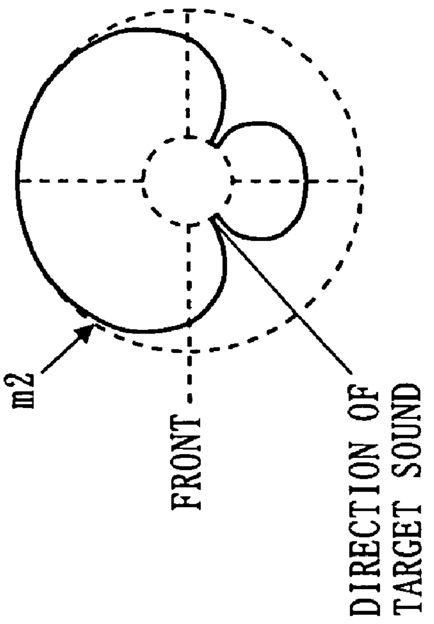

With reference to FIGS. 18A through 18C, a microphone device according to Embodiment 9 is described below. In Embodiment 9, as with Embodiment 5, a plurality of microphone units having the same directivity characteristic are used to obtain the main signal and the noise reference signal.

FIG. 18A is an illustration showing a part of the configuration of the microphone device according to Embodiment 9. The microphone device includes a third microphone unit 3, a fourth microphone unit 4, a directivity combining section 100, and an angle setting section 160. The microphone units 3 and 4 are placed similarly to those illustrated in FIG. 15. Note that, after the stages of obtaining the signal m1 and the signal m2, any one of the structures according to Embodiments 1 through 4 is applied.

In FIG. 18A, the directivity combining section 100 includes a first signal delaying section 101, a second signal delaying section 102, a third signal delaying section 121, a fourth signal delaying section 122, a first signal subtracting section 103, and a second signal subtracting section 104. The third signal delaying section 121 delays a signal output from the third microphone unit 3. The first signal delaying section 101 delays a signal output from the fourth microphone unit 4. The first signal subtracting section 103 subtracts a signal output from the first signal delaying section 101 from a signal output from the third signal delaying section 121, thereby obtaining the signal m1, which is the main signal. The fourth signal delaying section 122 delays the signal output from the fourth microphone unit 4. The second signal delaying section 102 delays the signal output from the third microphone unit 3. The second signal subtracting section 104 subtracts a signal output from the second signal delaying section 102 from a signal output from the fourth signal delaying section 122, thereby obtaining the signal m2, which is the noise reference signal. The angle setting section 160 controls a signal delay amount of the first signal delaying section 101 and a signal delay amount of the second signal delaying section 102 separately.

In FIG. 18A, the structure at the signal m1 side is symmetrical to that at the signal m2 side. With this, the directivity pattern of the signal m1 and that of the signal m2 are separately controlled. Therefore, the directivity patterns of the signals m1 and m2 can be designed as focusing the sensitivity of the target sound direction. Specifically, the directivity of the signal m1 is formed as illustrated in FIG. 18B with sensitivity and a noise suppressing effect being as high as possible in the target sound direction, while the directivity of the signal m2 is formed as illustrated in FIG. 18C with a direction of a minimum sensitivity in the directivity coinciding with the target sound direction.

As described above, according to Embodiment 9, a noise suppressing process at a later stage is auxiliary, and noise is suppressed mainly through a directivity combining process at a former stage. Therefore, in Embodiment 9, the directivity pattern of the signal m1 is formed with priority. Here, the directivity combining process is a linear process having a feature of being less prone to causing sound waveform distortion. On the other hand, the noise suppressing process is a non-linear process with the filter coefficient being varied with time, and therefore is prone to cause sound wave form distortion due to errors, such as a noise spectrum, in various estimating sections. In view of this, it is preferable that whether to adopt the directivity patterns illustrated in FIGS. 17B and 17C or those illustrated in FIGS. 18B and 18C be appropriately decided depending on the use environments (the magnitude of the target sound, an ambient noise level, reflection, reverberation, etc.) and the purposes (calling, voice recognition, recording, etc.).

Embodiment 10

Figure 19:
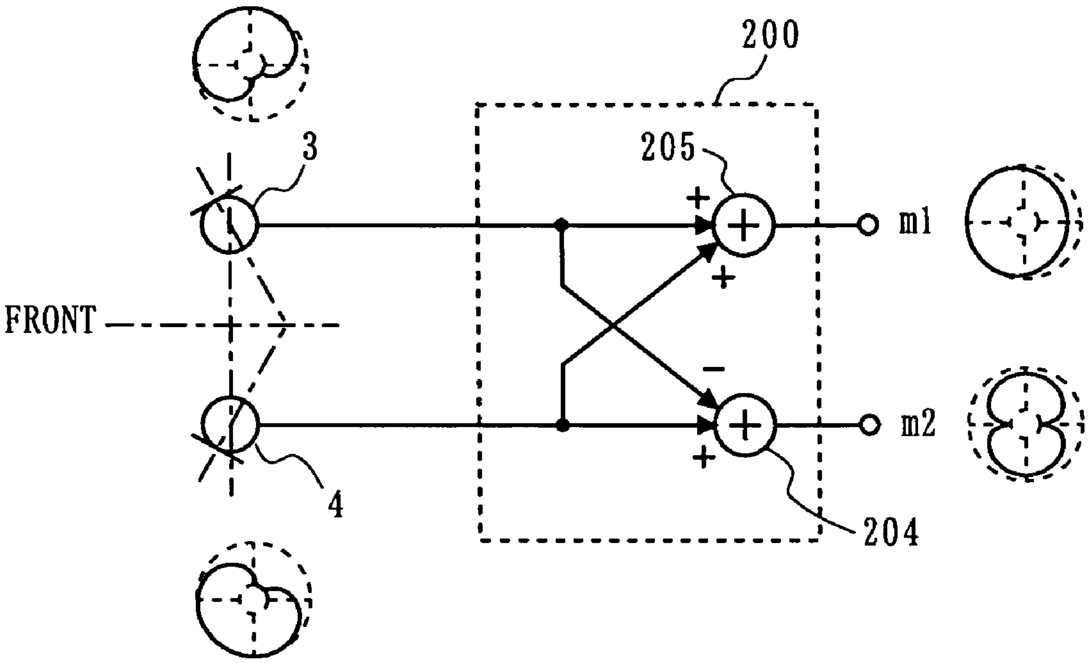
FIG. 19 is an illustration showing a part of the configuration of a microphone device according to Embodiment 10.

With reference to FIG. 19, a microphone device according to Embodiment 10 is described below. In Embodiment 10, the main signal and the noise reference signal required for a noise suppressing process according to the present invention are obtained in a device in which the main axes of directivity of two microphone units are oriented differently from each other.

FIG. 19 is an illustration showing a part of the configuration of the microphone device according to Embodiment 10. The microphone device includes a third microphone unit 3, a fourth microphone unit 4, and a directivity recombining section 200. Note that, after the stages of obtaining the signal m1 and the signal m2, any one of the structures according to Embodiments 1 through 4 is applied.

In FIG. 19, the microphone units 3 and 4 are placed similarly to those illustrated in FIG. 15. However, in FIG. 19, the main axis of directivity of the third microphone unit 3 is oriented to a direction obtained by rotating the front direction at a predetermined angle. Also, the main axis of directivity of the fourth microphone unit 4 is oriented to a direction obtained by rotating in reverse the front direction at the predetermined angle. Here, a signal output from the third microphone unit 3 is referred to as a right channel signal, while a signal output from the fourth microphone unit 4 is referred to as a left channel signal.

In FIG. 19, the directivity recombining section 200 includes a signal adding section 205 and a signal subtracting section 204. The signal adding section 205 adds the right channel signal and the left channel signal together, thereby obtaining the signal m1, which is the main signal. The signal subtracting section 204 subtracts the right channel signal from the left channel signal, thereby obtaining the signal m2, which is the noise reference signal.

Note that the structure of FIG. 19 according to the present invention is assumed to be applied to a device using a one-point stereo microphone, such as a video recorder. Such a device may be structured, for example, so as to normally perform a sound collecting process and, when only the sound in the front direction is enhanced as the target sound, perform a directivity recombining process in a manner as described below.

In view of auditory lateralization at replay, a normal one-point stereo microphone uses right and left microphone units whose amplitudes and phases are equal to each other, so that the same phase of a sound coming from center (front in FIG. 19) can be achieved in both of the microphones. Also, as described above, the same angle of directivity is set to the microphone units 3 and 4. Therefore, with the right and left channel signals being added together by the signal adding section 205, the signal m1 whose directivity is oriented to the front direction can be obtained. Also, by subtracting the right channel signal from the left channel signal at the signal subtracting section 204, the signal m2 whose direction of a minimum sensitivity in the directivity is oriented to the front direction can be obtained. As such, the signals m1 and m2 generated by the directivity recombining section 200 are similar to those in Embodiment 1. Therefore, by using these signals m1 and m2, a process of suppressing noise and a process of correcting distortion in reflection characteristic can be performed.

As described above, according to Embodiment 10, by using a signal output from a one-point stereo microphone, a sound in the target sound direction can be enhanced. Therefore, a device using such a one-point stereo microphone can be utilized as a zoom microphone, for example. Furthermore, in Embodiment 10, a directivity recombining process is performed based on a stereo signal. Therefore, the microphone device according to Embodiment 10 can be applied to a device for multi-channel sound collection in which a stereo signal and a signal in the front direction can be simultaneously obtained. Note that the stereo microphone with an analog circuit can also achieve effects similar to those described above.

Embodiment 11

Figure 20:
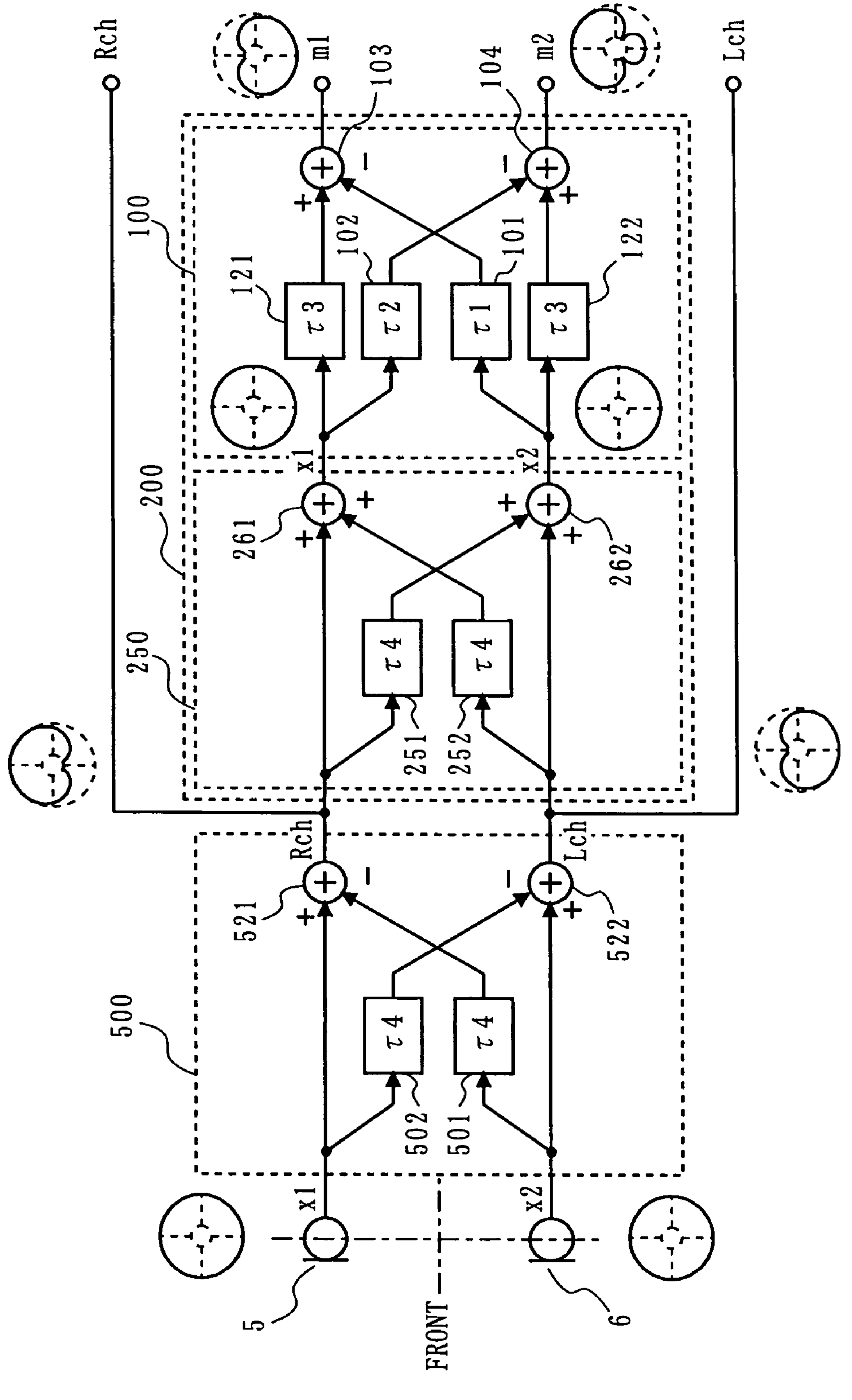
FIG. 20 is an illustration showing a part of the configuration of a microphone device according to Embodiment 11.

With reference to FIG. 20, a microphone device according to Embodiment 11 is described below. In Embodiment 11, the main signal and the noise reference signal required for a noise suppressing process according to the present invention are obtained in a device in which a stereo signal is generated.

FIG. 20 is an illustration showing a part of the configuration of the microphone device according to Embodiment 11. In FIG. 20, the microphone device includes a fifth microphone unit 5, a sixth microphone unit 6, a directivity combining section 500, and a directivity recombining section 200. The microphone units 5 and 6 are non-directional microphone units of the same characteristic. The microphone units 5 and 6 are placed similarly to the microphone units 3 and 4 illustrated in FIG. 15. The directivity combining section 500 is supplied with signals output from the microphone units 5 and 6 to output a right channel signal Rch and a left channel signal Lch. The directivity recombining section 200 is supplied with the right channel signal Rch and the left channel signal Lch to output a signal m1, which is the main signal with sensitivity in the target sound direction and a signal m2, which is the noise reference signal with a direction of a minimum sensitivity in the directivity being oriented to the target sound direction. Note that the target sound direction can be set in a direction other than the front direction.

In FIG. 20, the directivity recombining section 200 includes an inverse directivity combining section 250 and a directivity combining section 100. The inverse directivity combining section 250 is supplied with signals (the right channel signal Rch and the left channel signal Lch) output from the directivity combining section 500. From these right and left signal Rch and Lch, the inverse directivity combining section 250 generates a non-directional signal. The directivity combining section 100 is similar in structure to that described in Embodiment 5 except that the angle setting section 160 is not provided herein. Also, the directivity combining section 100 illustrated in FIG. 20 is similar to that illustrated in FIG. 18A, but the directivity combining section 100 may be similar in structure to anyone of those illustrated in FIGS. 15, 16A, and 17A.

In Embodiment 11, a stereo signal (the right channel signal Rch and the left channel signal Lch) obtained by the directivity combining section 500 are reconverted by the inverse directivity combining section 250 to signals that are identical to those output from the microphone units 5 and 6. That is, the stereo signal is reconverted to two non-directional signals. Furthermore, these non-directional signals obtained through re-conversion are converted by the directivity combining section 100 to a main signal and a noise reference signal for detecting the target sound coming from a predetermined direction.

Here, the directivity combining section 500 for outputting a stereo signal includes a first signal delaying section 501, a first signal subtracting section 521, a second signal delaying section 502, and a second signal subtracting section 522. The first signal delaying section 501 delays the signal output from the sixth microphone unit 6. The first signal subtracting section 521 subtracts a signal output from the first delay signal section 501 from the signal output from the fifth microphone unit 5, thereby outputting a signal Rch obtained as a result of subtraction. The second signal delaying section 502 delays the signal output from the fifth microphone unit 5. The second signal subtracting section 522 subtracts a signal output from the second delay signal section 502 from the signal output from the sixth microphone unit 6, thereby outputting a signal Lch obtained as a result of subtraction. The above-described operation of the directivity combining section 500 can be expressed by the following equation.

$$\begin{bmatrix} x1 \\ x2 \end{bmatrix}^T \begin{bmatrix} 1 & -H_{\tau 4}(\omega) \\ -H_{\tau 4}(\omega) & 1 \end{bmatrix} \times \frac{1}{1 - H_{\tau 4}(\omega)} = \begin{bmatrix} Rch \\ Lch \end{bmatrix}^T \quad (1)$$

Here, x1 and x2 on the left-hand side are signals output from the fifth and sixth microphone units 5 and 6, respectively. Rch and Lch on the right-hand side are stereo signals, respectively, output from the directivity combining section 500. The directivity combining section 500 has a structure generally employed for a directivity combining process, and therefore the structure is not described in detail. In Equation (1), a portion of $1/(1-H\tau 4\ (\omega))$ is a correction term for a frequency characteristic of 6 db/oct. Although a correcting process is performed in the actual microphone device, this process is left out of concern herein because this is not particularly related to the directivity characteristic. In order to reconvert the stereo signals (signals Rch and Lch) to signals (signals x1 and x2) output from the microphone units, an inverse matrix of a matrix of the second term on the left-hand side in Equation (1) is multiplied from the left of both sides. This can be achieved by a so-called inverse filter. This can be expressed by the following equations (2) and (3).

$$\begin{bmatrix} x1 \\ x2 \end{bmatrix}^T \begin{bmatrix} 1 & -H_{\tau 4}(\omega) \\ -H_{\tau 4}(\omega) & 1 \end{bmatrix} \begin{bmatrix} 1 & H_{\tau 4}(\omega) \\ H_{\tau 4}(\omega) & 1 \end{bmatrix} \times \frac{1}{1 - H_{\tau 4}(\omega)^2} = \begin{bmatrix} x1 \\ x2 \end{bmatrix}^T \quad (2)$$

$$\begin{bmatrix} Rch \\ Lch \end{bmatrix}^T \begin{bmatrix} 1 & H_{\tau 4}(\omega) \\ H_{\tau 4}(\omega) & 1 \end{bmatrix} \times \frac{1}{1 + H_{\tau 4}(\omega)} = \begin{bmatrix} x1 \\ x2 \end{bmatrix}^T \quad (3)$$

Therefore, by performing a process expressed by Equation (3) on the signals Rch and Lch, an inverse directivity combining process can be attained. The inverse directivity combining section 250 illustrated in FIG. 20 graphically represents Equation (3). From the signals x1 and x2 obtained in the above-described manner, the directivity combining section 100 generates the main signal m1 with sensitivity in the target sound direction and the noise reference signal m2 with a direction of a minimum sensitivity in the directivity being oriented to the target sound direction.

As described above, according to Embodiment 11, a signal output from a one-point stereo microphone is used. Also in this case, effects similar to those in Embodiment 10 can be achieved. That is, the target sound coming from the front direction can be enhanced, and distortion in frequency due to reflection can be corrected. Furthermore, in Embodiment 11, a target sound coming from an arbitrary direction can be handled.

The microphone device according to Embodiment 11 is particularly effective in a case where a signal output from the microphone units cannot be obtained but only a stereo signal is available. In short, according to Embodiment 11, it is possible to achieve the structure for obtaining a main signal of the target sound and an ideal noise reference signal even in a device where a stereo signal is generated.

Figure 21:
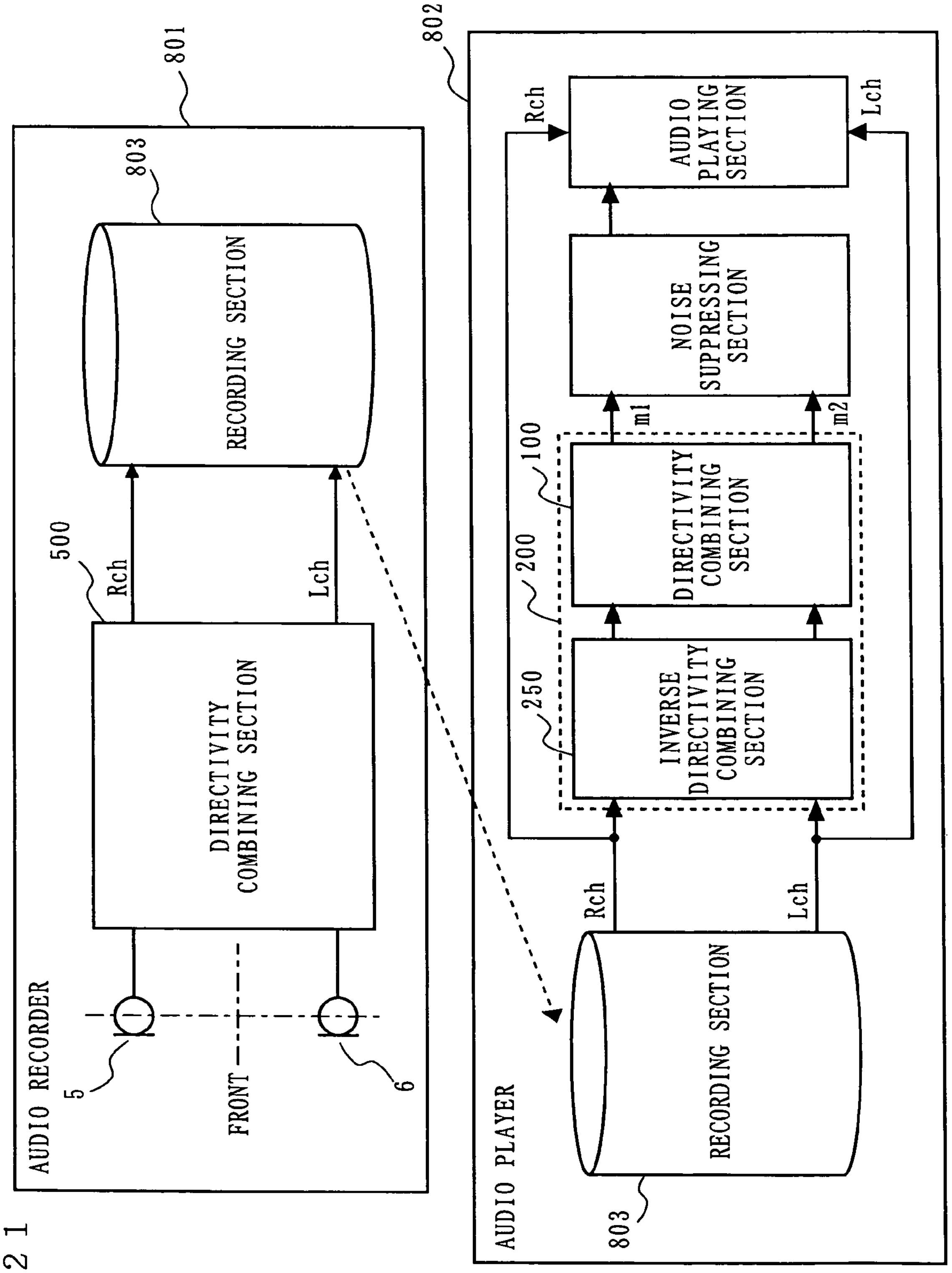
FIG. 21 is an illustration showing an application example of the microphone device according to Embodiment 11.

FIG. 21 is an illustration showing an application example of the microphone device according to Embodiment 11. In FIG. 21, a system structured by an audio recorder 801 and an audio player 802 is illustrated. The audio recorder 801 includes a fifth microphone unit 5, a sixth microphone unit 6, and a directivity combining section 500. A recording section 803 is a recording medium removably attached to the audio recorder 801 and the audio player 802. The audio player 802 includes a directivity recombining section 200. Although not shown, the audio player 802 includes any one of the microphone devices according to Embodiment 1 through 4.

In FIG. 21, the recording section 803 of the audio recorder 801 has recorded thereon a signal Rch and a signal Lch. With this, audio information is recorded on the recording section 803. With the recording section 803 having recorded thereon the audio information being attached to the audio player 802, the audio player 802 reads the information recorded on the recording section 803. Specifically, the signals Rch and Lch are read to the directivity recombining section 200. From these signals Rch and Lch, the directivity recombining section 200 generates a main signal and a noise reference signal. By using the main signal and the noise reference signal, a noise suppressing process on the target sound can be performed.

As described above, even if the audio recorder 801 and the audio player 802 are separately provided, the structure according to Embodiment 11 can be achieved. That is, it is possible to perform a noise suppressing process at the time of replay on a signal once recorded on the recording section 803 of, for example, a video recorder.

Figure 22:
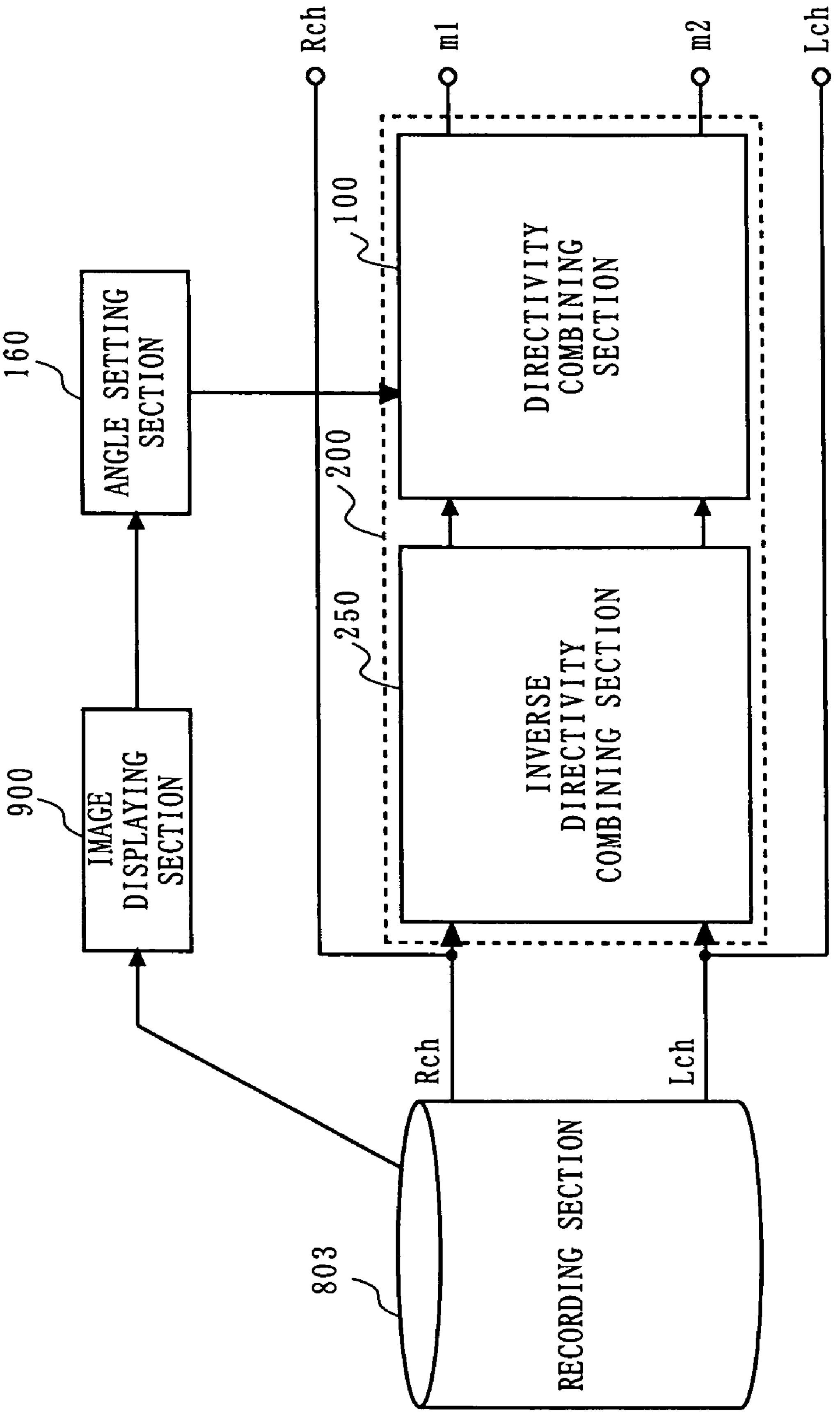
FIG. 22 is an illustration showing an application example of an audio player illustrated in FIG. 21.

FIG. 22 is an illustration showing an application example of an audio player illustrated in FIG. 21. In FIG. 22, the audio player 802 includes, in addition to the structure described with reference to FIG. 21, an image displaying section 900 and an angle setting section 160. That is, the audio player 802 illustrated in FIG. 22 has an image displaying function, and is implemented by, for example, a digital video camera.

In FIG. 22, the recording section 803 has recorded thereon, in addition to the audio information described in FIG. 21, image information based on which an image is to be displayed on the image displaying section. The audio information and the image information are related to each other, such as audio and images (video) simultaneously recorded by a digital video camera, for example. The audio information and the image information are simultaneously reproduced at the audio player 802. Here, while the audio information and the image information are being simultaneously reproduced, the user uses the angle setting section 160 to designate an angle. At this time, the user determines an angle while viewing an image displayed on the image displaying section. By way of example, while viewing a subject displayed at the center of the screen of the image displaying section, the user designates an angle indicative of a direction corresponding to the center of the screen (that is, the front direction). With this, the user can extract a sound coming from the front as the target sound to hear.

Figure 23:
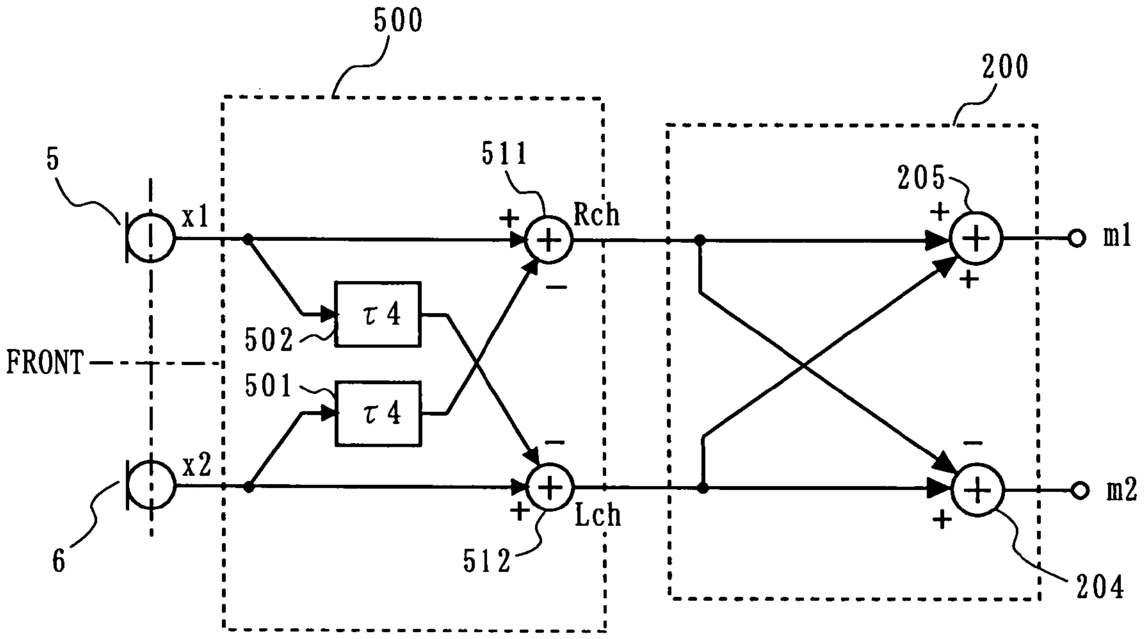
FIG. 23 is an illustration showing a part of the configuration of a microphone device according to another embodiment.
Figure 24:
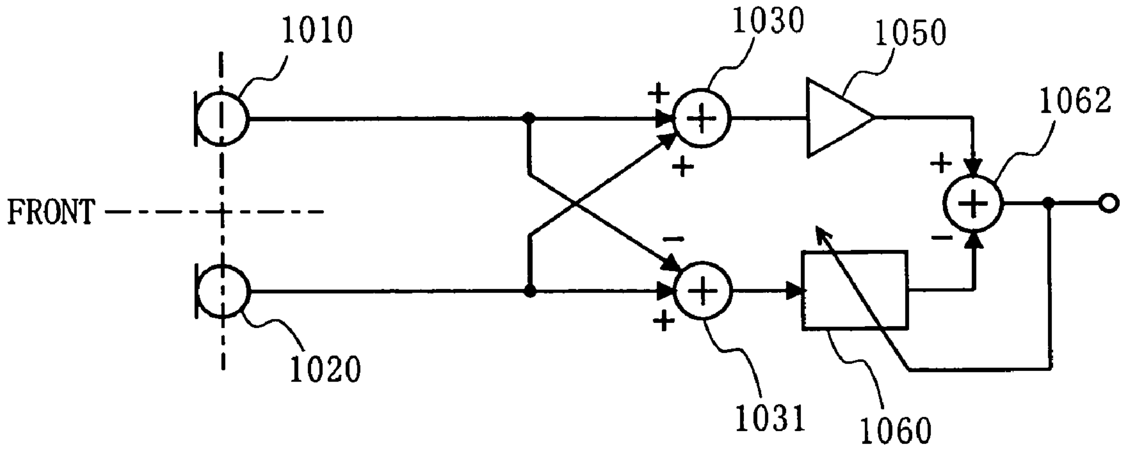
FIG. 24 PRIOR ART
FIG. 24 is an illustration showing the configuration of a conventional microphone device of Example 1.
Figure 25:
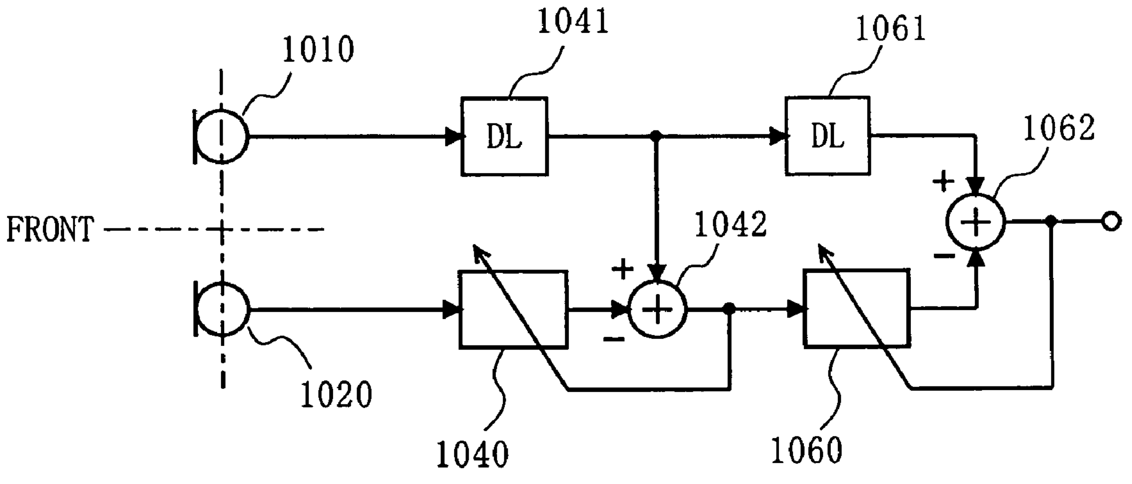
FIG. 25 PRIOR ART
FIG. 25 an illustration showing the configuration of a conventional microphone device of Example 2.
Figure 26:
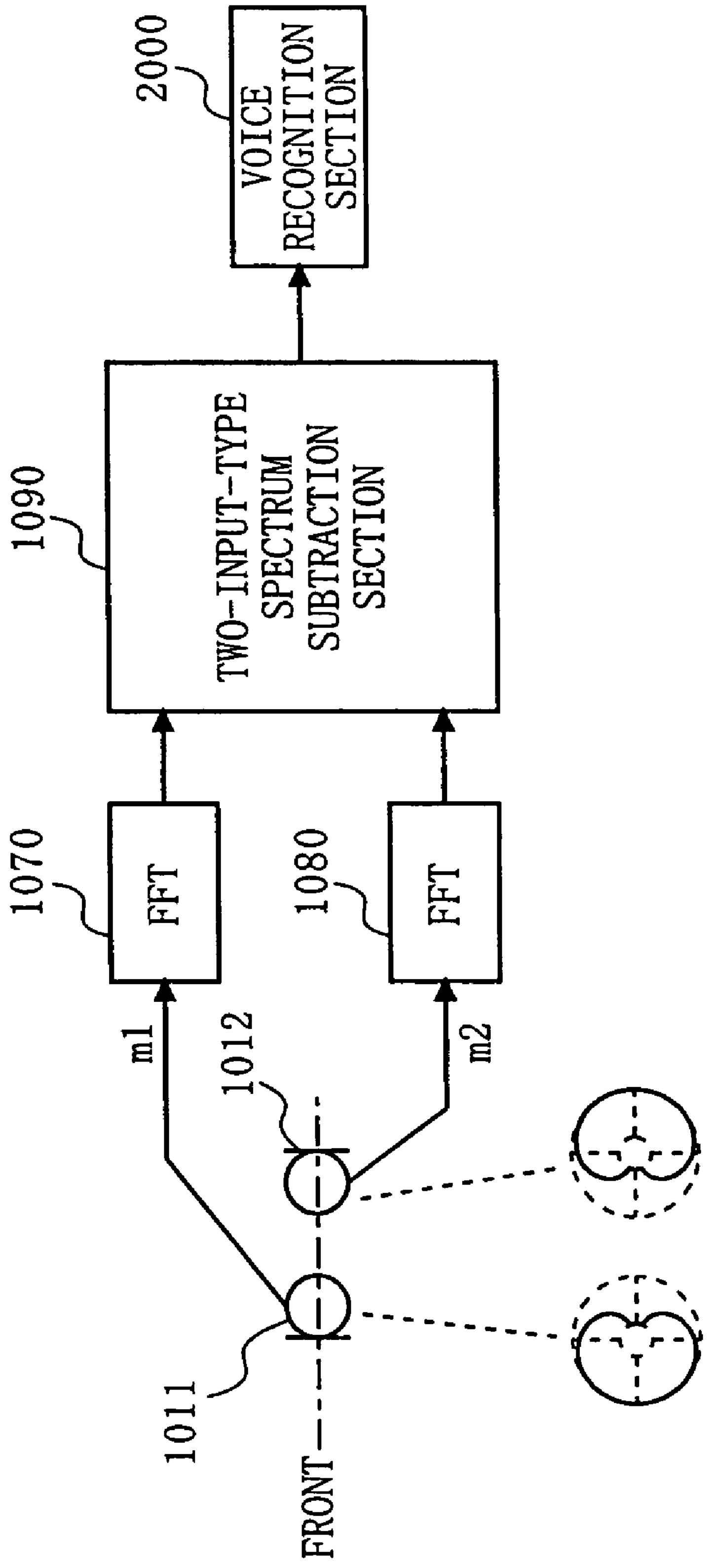
FIG. 26 PRIOR ART
FIG. 26 an illustration showing the configuration of a conventional microphone device of Example 3.

In another embodiment, the following structure can be applied. FIG. 23 is an illustration showing a part of the configuration of a microphone device according to the other embodiment. In FIG. 23, a fifth microphone unit 5, a sixth microphone unit 6, and a directivity combining section 500 are similar in structure to those illustrated in FIG. 20. Also, a directivity recombining section 200 is similar in structure to that illustrated in FIG. 19. Also with the structure illustrated in FIG. 23, effects similar to those of the above can be obtained. Note that, after the stages of obtaining the signal m1 and the signal m2, any one of the structures according to Embodiments 1 through 4 is applied.

As has been described in the foregoing, according to the present invention, as for an output from a directional microphone oriented in the target sound direction, stationary and non-stationary noise in a direction outside of the target sound direction is suppressed, thereby achieving a small-sized, ultradirectinal microphone. Furthermore, at the same time, the influence on the frequency characteristic of a reflected wave coming to the microphone device can be suppressed. With such effects, additive noise caused by accumulation of noise and multiplicative noise, such as a reflective wave, can both be suppressed, thereby achieving an always flat, high-S/N-ratio microphone frequency characteristic without suffering from the influence of the sound field. Furthermore, the noise suppressing section employs the structure for reducing a process delay, thereby making it possible to apply the microphone device of the present invention to loudspeakers and calling which do not allow a large delay. Still further, by using a combination of pretreatment processes, such as a directivity combining process, an inverse directivity combining process, and directivity recombining process, sounds of various directions can be extracted, and effects obtained accordingly at the player side can be achieved.

While the invention has been described in detail, the foregoing description is in all aspects illustrative and not restrictive. It is understood that numerous other modifications and variations can be devised without departing from the scope of the invention.

What is claimed is:

1. A microphone device which detects a target sound coming from a direction of the target sound, the microphone device comprising:

a signal generating section for generating a main signal indicative of a result obtained through detection with a sensitivity in the direction of the target sound and a noise reference signal indicative of a result obtained through detection with a sensitivity higher in another direction than in the direction of the target sound by orienting a direction of minimum sensitivity to the direction of the target sound;

a determining section for determining whether a level ratio indicative of a ratio of a level of the main signal to a level of the noise reference signal generated by the signal generating section is larger than a predetermined value;

an adaptive filter section including an adaptive filter, the adaptive filter section for generating a signal indicative of a signal component of the target sound included in the noise reference signal generated by the signal generating section by performing, by the adaptive filter, a filtering process on the main signal generated by the signal generating section, and for learning a filter coefficient only when the determining section determines that the level ratio is larger than the predetermined value;

a subtracting section for canceling a signal component of the target sound included in the noise reference signal by subtracting the signal generated by the adaptive filter section from the noise reference signal generated by the signal generating section; and a noise suppressing section for suppressing a signal component of noise included in the main signal by using the main signal and the noise reference signal after subtraction by the subtracting section, wherein the noise suppressing section includes:

a noise suppression filter coefficient calculating section for calculating, based on a power spectrum of the main signal and a power spectrum of the noise reference signal after subtraction by the subtraction section, a filter coefficient of a noise suppression filter for suppressing the signal component of the noise included in the main signal; and a time-variant coefficient filter section for causing the main signal to be subjected to a filtering process at the noise suppression filter by reflecting the filter coefficient calculated by the noise suppression filter coefficient calculation section.

2. The microphone device according to claim 1, wherein the signal generating section includes:

a first microphone unit positioned so that a main axis of directivity is oriented to the direction of the target sound; and a second microphone unit positioned so that a direction of minimum sensitivity of directivity is oriented to the direction of the target sound, wherein a signal output from the first microphone unit is the main signal and a signal output from the second microphone unit is the noise reference signal.

3. The microphone device according to claim 1, further comprising a signal delaying section, being provided between an output end of the noise reference signal in the signal generating section and the subtracting section, for delaying the noise reference signal so as to satisfy conditions of convergence of the adaptive filter of the adaptive filter section.

4. The microphone device according to claim 1, wherein the predetermined value is changeable.

5. The microphone device according to claim 1, wherein the signal generating section includes:

a first microphone unit;

a second microphone unit having a characteristic identical to a characteristic of the first microphone unit;

a delaying section for outputting a signal output from the first microphone unit as being delayed by a predetermined delay amount;

an amplifying section for amplifying the signal output from the delay section;

a first subtracting section for subtracting the signal amplified by the amplifying section from a signal output from the second microphone unit to generate the main signal; and a second subtracting section for subtracting the signal output from the delaying section from the signal output from the second microphone unit to generate the noise reference signal, wherein the predetermined delay amount is set so that a direction of minimum sensitivity of a directivity of the noise reference signal and a direction of minimum sensitivity of a directivity of the main signal are both directed to approximately the direction of the target sound, and an amplification factor in the amplifying section is set so that the sensitivity of the main signal is higher than the sensitivity of the noise reference signal in the direction of the target sound.

6. The microphone device according to claim 5, further comprising a setting section for changing the predetermined delay amount used in the delaying section.

7. The microphone device according to claim 1, wherein the signal generating section includes:

a first microphone unit;

a second microphone unit having a characteristic identical to a characteristic of the first microphone unit; and a combining section for generating, based on signals output from the first and second units, the main signal with the sensitivity in the direction of the target sound, and generating a noise signal with minimum sensitivity in the direction of the target sound.

8. The microphone device according to claim 1, wherein the signal generating section includes;

a first microphone unit;

a second microphone unit positioned so that a main axis of directivity is oriented to a direction which is different from a main axis of directivity of the first microphone unit;

a signal adding section for adding a first signal output from the first microphone unit and a second signal output from the second microphone unit to generate the main signal; and a signal subtracting section for subtracting a third signal, which is either one of the first signal and the second signal, from a fourth signal, which is either one of the first signal and the second signal but other than the third signal, to generate the noise reference signal.

9. The microphone device according to claim 1, wherein the signal generating section includes;

a first microphone unit;

a second microphone unit having a characteristic identical to a characteristic of the first microphone unit;

a stereo signal generating section for generating, based on the first and second microphone units, a stereo signal formed by a right channel signal and a left channel signal;

an inverse combining section for generating, based on the stereo signal, signals output from the first and second microphone units; and a combining section for generating the main signal and the noise reference signal based on the signals generated by the inverse combining section.

10. The microphone device according to claim 1, wherein the signal generating section includes;

a first microphone unit;

a second microphone unit having a characteristic identical to a characteristic of the first microphone unit;

a stereo signal generating section for generating, based on the first and second microphone units, a stereo signal formed by a right channel signal and a left channel signal;

a signal adding section for adding the right channel signal and the left channel signal to generate the main signal; and a signal subtracting section for subtracting a first signal, which is either one of the right channel signal and the left channel signal, from a second signal, which is either one of the right channel signal and the left channel signal but other than the first signal, to generate the noise reference signal.

11. The microphone device according to claim 1, further comprising:

a reflection information calculating section for calculating, based on the filter coefficient of the adaptive filter section, information about a difference in arrival time between a direct wave of the target sound and a reflected wave of the target sound; and a reflection correcting section for correcting, based on the information calculated by the reflection information calculating section, distortion in a frequency characteristic of the main signal caused by the reflected wave, wherein the noise suppressing section suppresses the signal component of the noise included in the main signal by using the main signal corrected by the reflection correcting section and the noise reference signal after subtraction by the subtracting section.

12. The microphone device according to claim 1, wherein the noise suppression filter coefficient calculating section includes:

a first frequency analyzing section for calculating the power spectrum of the main signal;

a second frequency analyzing section for calculating the power spectrum of the noise reference signal after subtraction by the subtracting section;

a power spectrum ratio calculating section for calculating a time average of a power spectrum ratio between the power spectrum calculated by the first frequency analyzing section and the power spectrum calculated by the second frequency analyzing section only when the determining section determines that the level ratio is smaller than the predetermined value;

a multiplying section for multiplying the time average of the power spectrum ratio calculated by the power spectrum ratio calculating section by the power spectrum calculated by the second frequency analyzing section; and a coefficient calculating section for calculating the filter coefficient of the noise suppression filter based on the power spectrum calculated by the first frequency analyzing section and the multiplication result of the multiplying section.

13. A microphone device which detects a target sound coming from a direction of the target sound, the microphone device comprising:

a signal generating section for generating a main signal indicative of a result obtained through detection with a sensitivity in the direction of the target sound and a noise reference signal indicative of a result obtained through detection with a sensitivity higher in another direction than in the direction of the target sound by orienting a direction of minimum sensitivity to the direction of the target sound;

a determining section for determining whether a level ratio indicative of a ratio of a level of the main signal to a level of the noise reference signal generated by the signal generating section is larger than a predetermined value;

an adaptive filter section including an adaptive filter, the adaptive filter section for generating a signal indicative of a signal component of the target sound included in the noise reference signal generated by the signal generating section by subjecting the main signal generated by the signal generating section to a filtering process at the adaptive filter, and for learning a filter coefficient only when the determining section determines that the level ratio is larger than the predetermined value;

a subtracting section for canceling a signal component of the target sound included in the noise reference signal by subtracting the signal generated by the adaptive filter section from the noise reference signal generated by the signal generating section;

a reflection information calculating section for calculating information about a difference in arrival time between a direct wave of the target sound and a reflected wave of the target sound; and a reflection correcting section for correcting, based on the information calculated by the reflection information calculating section, distortion in a frequency characteristic of the main signal caused by the reflected wave.

14. The microphone device according to claim 13, wherein the signal generating section includes;

a first microphone unit positioned so that a main axis of directivity is oriented to the direction of the target sound; and a second microphone unit positioned so that a direction of minimum sensitivity of directivity is oriented to the direction of the target sound, wherein a signal output from the first microphone unit is the main signal and a signal output from the second microphone unit is the noise reference signal.

15. The microphone device according to claim 13, further comprising a signal delay section, being provided between an output end of the noise reference signal in the signal generating section and the subtracting section, for delaying the noise reference signal so as to satisfy conditions of convergence of the adaptive filter of the adaptive filter section.

16. The microphone device according to claim 13, wherein the predetermined value is changeable.

17. The microphone device according to claim 13, wherein the signal generating section includes;

a first microphone unit;

a second microphone unit having a characteristic identical to a characteristic of the first microphone unit;

a delaying section for outputting a signal output from the first microphone unit as being delayed by a predetermined delay amount;

an amplifying section for amplifying the signal output from the delay section;

a first subtracting section for subtracting the signal amplified by the amplifying section from a signal output from the second microphone unit to generate the main signal; and a second subtracting section for subtracting the signal output from the delaying section from the signal output from the second microphone unit to generate the noise reference signal, wherein the predetermined delay amount is set so that a direction of minimum sensitivity of a directivity of the noise reference signal and a direction of minimum sensitivity of a directivity of the main signal are both directed to approximately the direction of the target sound, and an amplification factor in the amplifying section is set so that the sensitivity of the main signal is higher than the sensitivity of the noise reference signal in the direction of the target sound.

18. The microphone device according to claim 17, further comprising a setting section for changing the predetermined delay amount used in the delaying section.

19. The microphone device according to claim 13, wherein the signal generating section includes;

a first microphone unit;

a second microphone unit having a characteristic identical to a characteristic of the first microphone unit; and a combining section for generating, based on signals output from the first and second microphone units, the main signal with the sensitivity in the direction of the target sound, and generating a noise signal with minimum sensitivity in the direction of the target sound.

20. The microphone device according to claim 13, wherein the signal generating section includes:

a first microphone unit;

a second microphone unit positioned so that a main axis of directivity is oriented to a direction which is different from a main axis of directivity of the first microphone unit;

a signal adding section for adding a first signal output from the first microphone unit and a second signal output from the second microphone unit to generate the main signal; and a signal subtracting section for subtracting a third signal, which is either one of the first signal and the second signal, from a fourth signal, which is either one of the first signal and the second signal but other than the third signal, to generate a noise reference signal.

21. The microphone device according to claim 13, wherein the signal generating section includes:

a first microphone unit;

a second microphone unit having a characteristic identical to a characteristic of the first microphone unit;

a stereo signal generating section for generating, based on the first and second microphone units, a stereo signal formed by a right channel signal and a left channel signal;

an inverse combining section for generating, based on the stereo signal, signals output from the first and second microphone units; and a combining section for generating the main signal and the noise reference signal based on the signals generated by the inverse combining section.

22. The microphone device according to claim 13, wherein the signal generating section includes:

a first microphone unit;

a second microphone unit having a characteristic identical to a characteristic of the first microphone unit;

a stereo signal generating section for generating, based on the first and second microphone units, a stereo signal formed by a right channel signal and a left channel signal;

a signal adding section for adding the right channel signal and the left channel signal to generate a main signal; and a signal subtracting section for subtracting a first signal, which is either one of the right channel signal and the left channel signal, from a second signal, which is either one of the right channel signal and the left channel signal but other than the first signal, to generate a noise reference signal.

23. An audio player comprising:

an audio recording section for recording audio signals of channels of at least two types;

a signal generating section for generating, based on the audio signals recorded on the audio recording section, a main signal indicative of a result obtained through detection with a sensitivity in the direction of the target sound and a noise reference signal indicative of a result obtained through detection with a sensitivity higher in another direction than in the direction of the target sound by orienting a direction of minimum sensitivity to the direction of the target sound;

a determining section for determining whether a level ratio indicative of a ratio of a level of the main signal to a level of the noise reference signal generated by the signal generating section is larger than a predetermined value;

an adaptive filter section including an adaptive filter, the adaptive filter section for generating a signal indicative of a signal component of the target sound included in the noise reference signal generated by the signal generating section by performing, by the adaptive filter, a filtering process on the main signal generated by the signal generating section, and for learning a filter coefficient only when the determining section determines that the level ratio is larger than the predetermined value;

a subtracting section for canceling a signal component of the target sound included in the noise reference signal by subtracting the signal generated by the adaptive filter section from the noise reference signal generated by the signal generating section;

a noise suppressing section for suppressing a signal component of noise included in the main signal by using the main signal and the noise reference signal after subtraction by the subtracting section; and a reproducing section for reproducing the main signal with the signal component of the noise being suppressed by the noise suppressing section, wherein the noise suppressing section includes;

a noise suppression filter coefficient calculating section for calculating, based on a power spectrum of the main signal and a power spectrum of the noise reference signal after subtraction by the subtraction section, a filter coefficient of a noise suppression filter for suppressing the signal component of the noise included in the main signal; and a time-variant coefficient filter section for causing the main signal to be subjected to a filtering process at the noise suppression filter by reflecting the filter coefficient calculated by the noise suppression filter coefficient calculation section.

24. The audio player according to claim 23, further comprising:

a video recording section for recording a video signal related to the audio signals recorded on the audio recording section;

a video reproducing section for reproducing the video signal recorded on the video recording section; and a direction accepting section for accepting from a user an input of a direction in which a sound is to be enhanced, wherein the signal generating section generates the main signal and the noise reference signal by taking the direction accepted by the direction accepting section as the direction of the target sound.

* * * * *

UNITED STATES PATENT AND TRADEMARK OFFICE

CERTIFICATE OF CORRECTION

PATENT NO. : 7,577,262 B2
APPLICATION NO. : 10/714857
DATED : August 18, 2009
INVENTOR(S) : Takeo Kanamori et al.

It is certified that error appears in the above-identified patent and that said Letters Patent is hereby corrected as shown below:

On the Title Page

In Section (56) References Cited, under the "OTHER PUBLICATIONS" heading, please change "Report of 1EICE," to --Report of IEICE,--.

In the Claims

In column 35, claim 7, line 18, please change "the first and second units," to --the first and second microphone units,--.

Signed and Sealed this

Ninth Day of February, 2010

David J. Kappos
*Director of the United States Patent and Trademark Office*